(12) United States Patent
Tabata et al.

(10) Patent No.: US 8,865,286 B2
(45) Date of Patent: Oct. 21, 2014

(54) OPTICAL INFORMATION RECORDING MEDIUM

(71) Applicant: Sony Corporation, Tokyo (JP)

(72) Inventors: Hiroshi Tabata, Miyagi (JP); Takeshi Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/101,959

(22) Filed: Dec. 10, 2013

(65) Prior Publication Data

US 2014/0099466 A1 Apr. 10, 2014

Related U.S. Application Data

(63) Continuation of application No. 13/355,807, filed on Jan. 23, 2012, now abandoned.

(30) Foreign Application Priority Data

Feb. 3, 2011 (JP) ................... 2011-022182

(51) Int. Cl.
| | |
|---|---|
| *G11B 7/24* | (2013.01) |
| *G11B 7/2403* | (2013.01) |
| *G11B 7/2578* | (2013.01) |
| G11B 7/257 | (2013.01) |
| G11B 7/253 | (2013.01) |
| G11B 7/243 | (2013.01) |

(52) U.S. Cl.
CPC .... *G11B 7/2403* (2013.01); *G11B 2007/25715* (2013.01); *G11B 2007/25706* (2013.01); *G11B 2007/25301* (2013.01); *G11B 2007/24308* (2013.01); *G11B 2007/25708* (2013.01); *G11B 2007/24306* (2013.01); *G11B 2007/24304* (2013.01); *G11B 2007/2571* (2013.01); *G11B 2007/2432* (2013.01); *G11B 7/2578* (2013.01)
USPC .................. 428/64.1; 428/64.4; 430/270.12

(58) Field of Classification Search
USPC ...................... 428/64.4; 430/270.12
See application file for complete search history.

(56) References Cited

U.S. PATENT DOCUMENTS

| 8,642,152 | B2 * | 2/2014 | Tabata ...................... 428/64.1 |
|---|---|---|---|
| 2011/0044157 | A1 | 2/2011 | Miki et al. |
| 2011/0216643 | A1 | 9/2011 | Tauchi et al. |
| 2012/0015133 | A1 | 1/2012 | Tabata |
| 2012/0201117 | A1 | 8/2012 | Gouko |
| 2012/0201992 | A1 * | 8/2012 | Tabata et al. ............... 428/64.4 |

FOREIGN PATENT DOCUMENTS

| JP | 2009-129526 | 6/2009 |
|---|---|---|
| JP | 2010-218636 | 9/2010 |

* cited by examiner

*Primary Examiner* — Elizabeth Mulvaney

(74) *Attorney, Agent, or Firm* — K&L Gates LLP

(57) ABSTRACT

An optical information recording medium includes: a substrate; two or more information signal layers provided on the substrate; and a cover layer provided on the information signal layers. At least one of the two or more information signal layers is provided with an inorganic recording layer including Pd oxide, a first protective layer provided on a first main surface of the inorganic recording layer, and a second protective layer provided on a second main surface of the inorganic recording layer. And at least one of the first protective layer and the second protective layer includes a compound oxide of Si oxide, In oxide and Zr oxide as a main component.

7 Claims, 8 Drawing Sheets

(1) TEST EXAMPLE 3-1: ITO LAYER ON BOTH UPPER AND LOWER SIDES OF WZCPO LAYER
(2) TEST EXAMPLE 3-2: SIZ LAYER ON LOWER SIDE OF WZCPO LAYER
(3) TEST EXAMPLE 3-3: SIZ LAYER ON UPPER SIDE OF WZCPO LAYER
(4) TEST EXAMPLE 3-4: SIZ LAYER ON BOTH UPPER AND LOWER SIDES OF WZCPO LAYER

OPTICAL INFORMATION RECORDING MEDIUM

CROSS REFERENCES TO RELATED APPLICATIONS

The present application is a continuation application of U.S. patent application Ser. No. 13/355,807 filed on Jan. 23, 2012, which application claims priority to Japanese Priority Patent Application JP 2011-022182 filed in the Japan Patent Office on Feb. 3, 2011, the entire content of which is hereby incorporated by reference.

BACKGROUND

The present disclosure relates to an optical information recording medium. More specifically, the present disclosure relates to an optical information recording medium having two or more information signal layers.

Hitherto, CDs (Compact Discs) and DVDs (Digital Versatile Discs) and the like have driven the market for optical information recording media. However, in recent years, there has been a demand for optical information recording media with a further increased capacity accompanying a rapid increase in data handled by high definition televisions and PCs (Personal Computers). Mass storage optical information recording media for blue lasers such as BD (Blu-ray Disc (registered trademark)) have been developed to meet such a demand and the market for new, mass storage optical information recording media is continuing to grow.

As recordable optical information recording media, there are rewritable optical information recording media as represented by CD-RW (Compact Disc-ReWritable), and DVD±RW (Digital Versatile Disc±ReWritable), as well as write-once optical information recording media as represented by CD-R (Compact Disc-Recordable), and DVD-R (Digital Versatile Disc-Recordable). In particular, the latter have contributed greatly to the expansion of the market as low cost media. Accordingly, with large capacity optical information recording media for blue lasers as well, it is necessary to lower the price of write-once optical information recording media in order to expand the market. Furthermore, it is generally said that the storage reliability of the optical information recording media is high compared to hard disk drives (HDD), flash memory and the like due to the recording and reproduction principles thereof, with the result that in recent years such media have been in more and more demand as archival media such as those which are beginning to be used to store important information.

As the recording material used in write-once optical information recording media, there are inorganic material and organic coloring material. In a typical write-once optical information recording medium, organic coloring materials have been primarily studied as the recording material. However, in the large-capacity optical information recording media of recent years, inorganic materials have been studied extensively as the recording material.

For example, in Japanese Unexamined Patent Application Publication No. 2010-218636, an optical information recording medium having an inorganic recording layer including Pd and O is proposed. In addition, in a similar optical information recording medium in Japanese Unexamined Patent Application Publication No. 2009-129526, an optical information recording medium, which is provided with a protective layer of a mixture (ITO) of indium oxide and tin oxide as a main component on at least one surface of the inorganic recording layer including Pd and O in order to achieve both storage reliability and good productivity, is proposed.

SUMMARY

However, there are difficulties in obtaining a favorable power margin with the optical information recording medium provided with a protective layer of a mixture (ITO) of indium oxide and tin oxide as a main component on at least one surface of the inorganic recording layer.

It is desirable to provide an optical information recording medium having a favorable power margin.

According to a first embodiment of the present disclosure, there is provided an optical information recording medium including: a substrate; two or more information signal layers provided on the substrate; and a cover layer provided on the information signal layers, in which at least one layer out of the two or more information signal layers is provided with an inorganic recording layer including Pd oxide, a first protective layer provided on a first main surface of the inorganic recording layer, and a second protective layer provided on a second main surface of the inorganic recording layer, and in which at least one of the first protective layer and the second protective layer includes a compound oxide of Si oxide, In oxide, and Zr oxide as a main component.

According to a second embodiment of the present disclosure, there is provided an optical information recording medium recording layer that including: a substrate; two or more information signal layers provided on the substrate; and a cover layer provided on the information signal layers, in which at least one layer out of the two or more information signal layers is provided with an inorganic recording layer including Pd oxide, a first protective layer provided on a first main surface of the inorganic recording layer, and a second protective layer provided on a second main surface of the inorganic recording layer, and in which at least one of the first protective layer and the second protective layer includes a compound oxide of In oxide, Ga oxide, and Zn oxide as a main component.

In the first and second embodiments, the thickness of the cover layer is not particularly limited, and the cover layer includes the substrate, a sheet, the coating layer and the like. As a preferable high-density optical information recording medium, there is one having a configuration in which, with the use of a high NA objective lens, a thin light transmissive layer such as a sheet or a coating layer is adopted as a cover layer, and the recording and reproduction of information signals is performed by irradiating light from the side of the light transmissive layer. In such a case, it is possible to adopt an opaque substrate as the substrate. The light incidence plane for recording and reproducing the information signal is appropriately set to at least one surface of the cover layer side and the substrate side according to the format of the optical information recording medium.

In the first and second embodiments, the inorganic recording layer preferably includes W oxide, Pd oxide and Cu oxide as a main component and even more preferably includes Zn oxide in addition to these oxides.

In the first and second embodiments, one surface of either the substrate side or the cover layer side is preferably a light irradiation plane on which light for recording or reproducing an information signal on two or more information signal layers is irradiated.

In the first embodiment, it is preferable that the layer out of the first protective layer and the second protective layer, which is on the opposite side to the light irradiation plane, include a compound oxide of Si oxide, In oxide, and Zr oxide, and it is preferable that both of the first protective layer and the second protective layer include a compound oxide of Si oxide, In oxide and Zr oxide as a main component.

In the first embodiment, it is preferable that at least one layer out of the information signal layers other than the information signal layer furthest to the back from the light irradiation plane is an information signal layer in which at least one of the first protective layer and the second protective layer includes a compound oxide of Si oxide, In oxide and Zr oxide as a main component. It is preferable that the inorganic recording layer of the information signal layer which is closest to the light irradiation plane out of the two or more information signal layers is an information signal layer in which at least one of the first protective layer and the second protective layer includes a compound oxide of Si oxide, In oxide and Zr oxide as a main component.

In the second embodiment, it is preferable that the layer out of the first protective layer and the second protective layer which is the opposite side to the light irradiation plane include a compound oxide of In oxide, Ga oxide and Zn oxide and it is preferable that both the first protective layer and the second protective layer include a compound oxide of In oxide, Ga oxide, and Zn oxide as a main component.

In the first embodiment, it is preferable that at least one layer out of the information signal layers other than the information signal layer furthest to the back from the light irradiation plane be an information signal layer in which at least one of the first protective layer and the second protective layer includes a compound oxide of In oxide, Ga oxide and Zn oxide as a main component. It is preferable that the inorganic recording layer of the information signal layer which is closest to the light irradiation plane out of the two or more information signal layers be an information signal layer in which at least one of the first protective layer and the second protective layer includes a compound oxide of In oxide, Ga oxide and Zn oxide as a main component.

As described above, according to the embodiments, it is possible to realize an optical information recording medium having a favorable power margin.

Additional features and advantages are described herein, and will be apparent from the following Detailed Description and the figures.

DETAILED DESCRIPTION

Embodiments of the present disclosure will be described below with reference to the drawings.

[Configuration of the Optical Information Recording Medium]

Figure 1A:
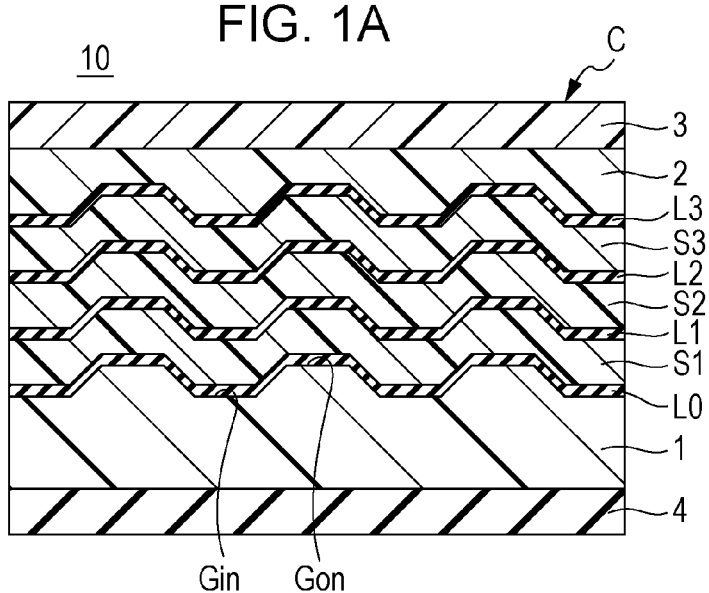
FIG. 1A is a schematic cross-sectional view showing an example configuration of an optical information recording medium according to one embodiment of the present disclosure and FIG. 1B is a schematic diagram showing a configuration example of each information signal layer shown in FIG. 1A.

FIG. 1A is a schematic cross-sectional view showing an example configuration of an optical information recording medium according to one embodiment of the present disclosure. The optical information recording medium 10 is a so-called write-once optical information recording medium, and, as shown in FIG. 1A, has a configuration in which an information signal layer L0, an intermediate layer S1, an information signal layer L1, an intermediate layer S2, an information signal layer L2, an intermediate layer S3, an information signal layer L3, and a light transmissive layer 2 which is a cover layer are laminated in such an order on the main surface of the substrate 1. If necessary, a hard coat layer 3 may further be provided on the surface of the light transmissive layer 2. If necessary, a barrier layer 4 may further be provided on the surface of the substrate 1 side. In the description below, information signal layer L is used where no particular distinction is made between the information signal layers L0 to L3.

In the optical information recording medium 10 according to the first embodiment, recording and reproduction of the information signal is performed by irradiating the laser beam from the surface C of the light transmissive layer 2 side to each of the information signal layers L0 to L3. For example, recording and reproduction of the information signal is performed by condensing a laser beam having a wavelength range of 400 nm to 410 nm with an objective lens having a numerical aperture range of 0.84 to 0.86, and irradiating the laser beam from the side of the light transmissive layer 2 to each of the information signal layers L0 to L3. As such an optical information recording medium 10, for example, BD-R may be exemplified. Below, the surface C which is irradiated by the laser beam for recording or reproducing the information signal on the information signal layers L0 to L3 is called the light irradiation plane C.

Below, the substrate 1, the information signal layers L0 to L3, intermediate layers S1 to S3, light transmissive layer 2, hard coat layer 3, and barrier layer 4 configuring the optical information recording medium 10 will be described in order.

(Substrate)

The substrate 1, for example, has a circular shape in which an opening is formed in the center (hereinafter, called the center hole). The main surface of the substrate 1, for example, is concavo-convex, and the information signal layer L0 is deposited on such a concavo-convex surface. Below, in the concavo-convex surface, concave portions are referred to as in-grooves Gin and convex portions are referred to as on-grooves Gon.

As the shape of the in-groove Gin and the on-groove Gon, for example, various shapes may be exemplified such as spiral shapes and concentric circles. Further, the in-grooves Gin and/or the on-grooves Gon, for example, are made to wobble (meander) in order to add linear velocity stability and address information.

The diameter of the substrate 1 may be selected as 120 mm for example. The thickness of the substrate 1 is selected while taking the stiffness into account and is preferably 0.3 mm to 1.3 mm, more preferably 0.6 mm to 1.3 mm; for example, 1.1 mm may be selected. Further, the diameter of the center hole may be selected as 15 mm, for example.

As the material of the substrate 1, for example, a plastic material or glass may be used, and, from a cost standpoint, it is preferable to use a plastic material. As the plastic material, for example, polycarbonate resins, polyolefin resins, acrylic resins, or the like may be used.

(Information Signal Layer)

Figure 1B:
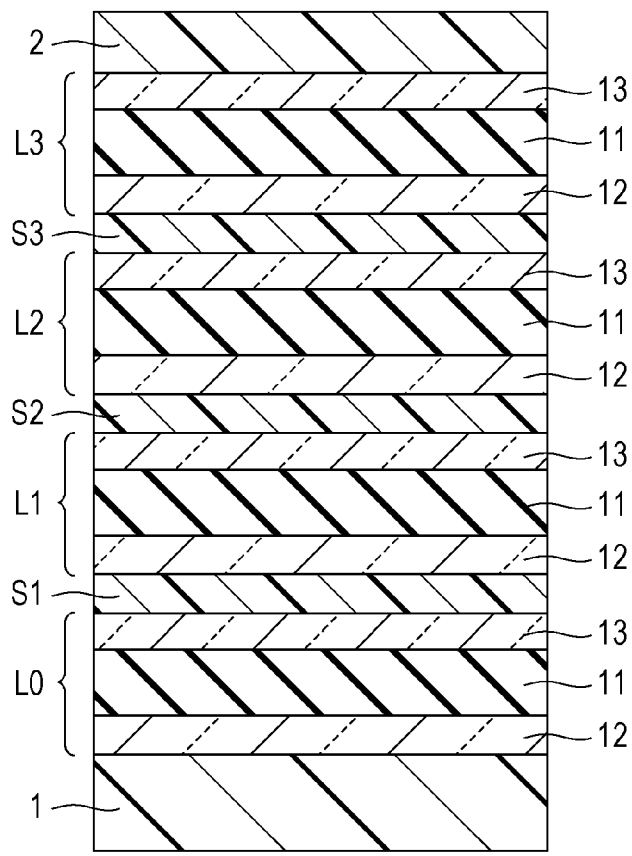
Figure 2A:
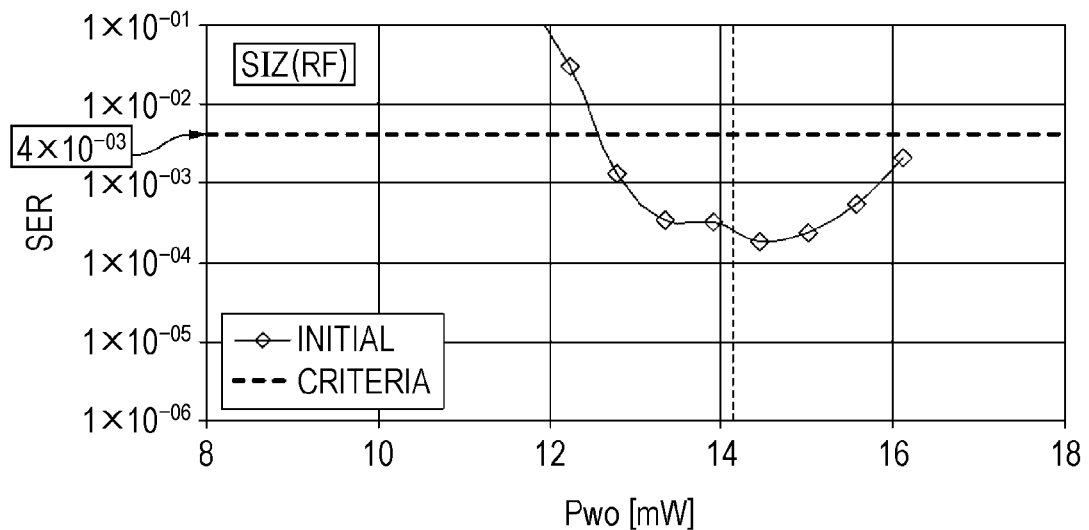
FIG. 2A is a graph showing the power margin of the optical information recording medium in Test Example 1-1 and FIG. 2B is a graph showing the power margin of the optical information recording medium in Test Example 1-2.
Figure 2B:
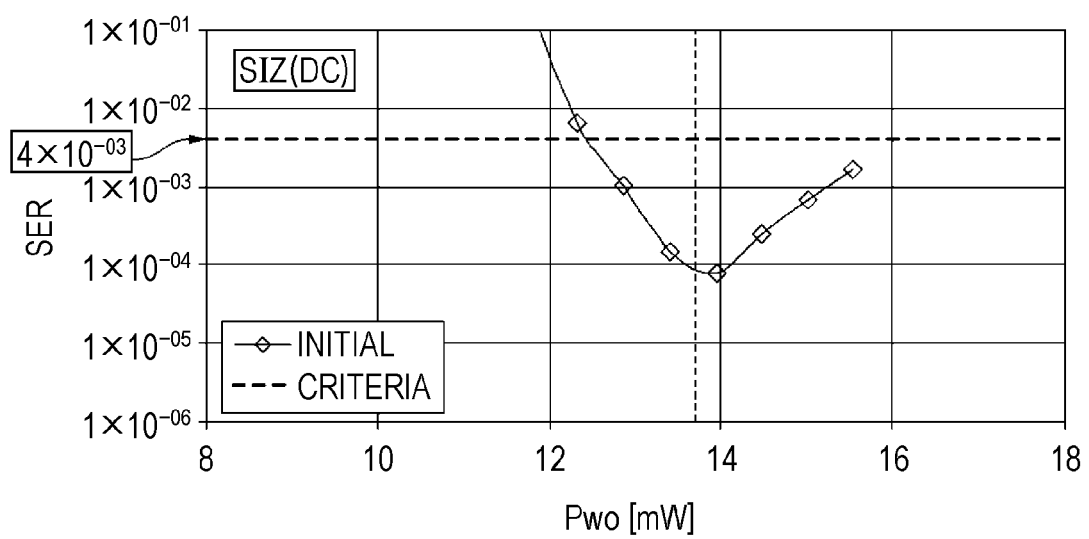
Figure 3:
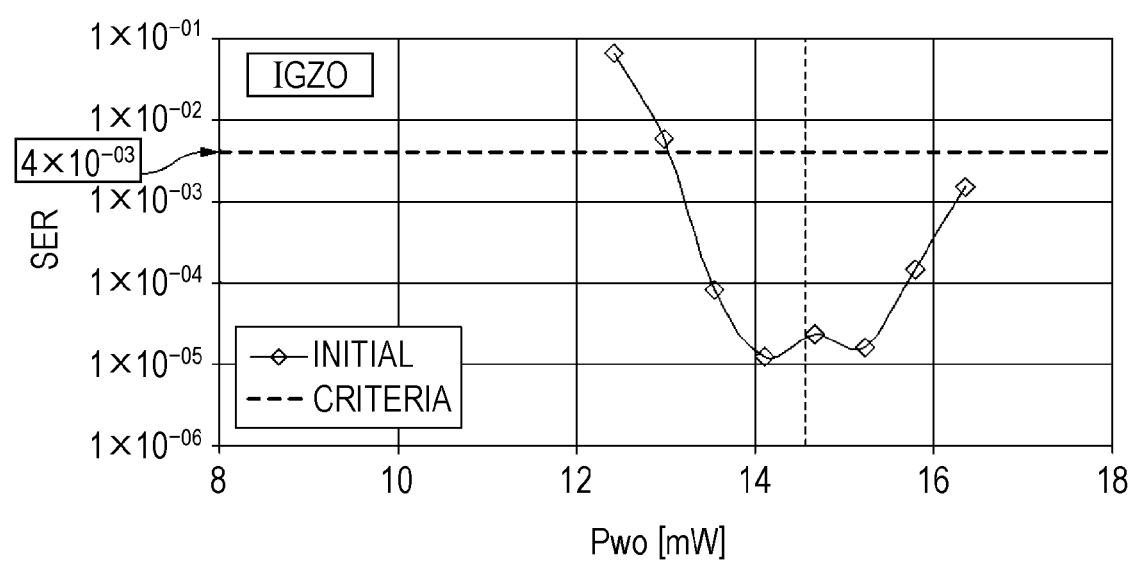
FIG. 3 is a graph showing the power margin of the optical information recording medium in Test Example 1-3.
Figure 4A:
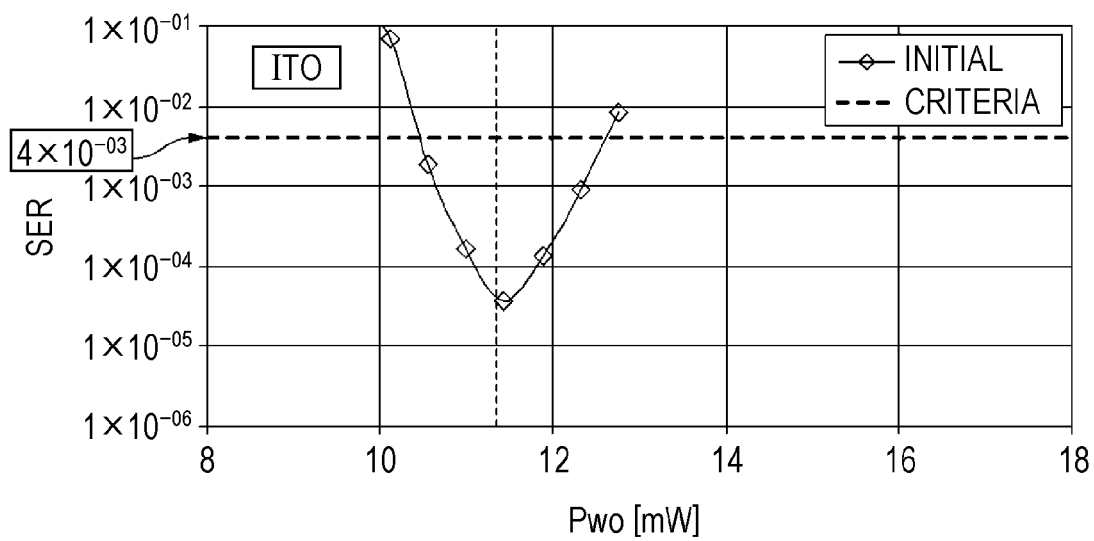
FIG. 4A is a graph showing the power margin of the optical information recording medium in Test Example 1-4 and FIG. 4B is a graph showing the power margin of the optical information recording medium in Test Example 1-5.
Figure 4B:
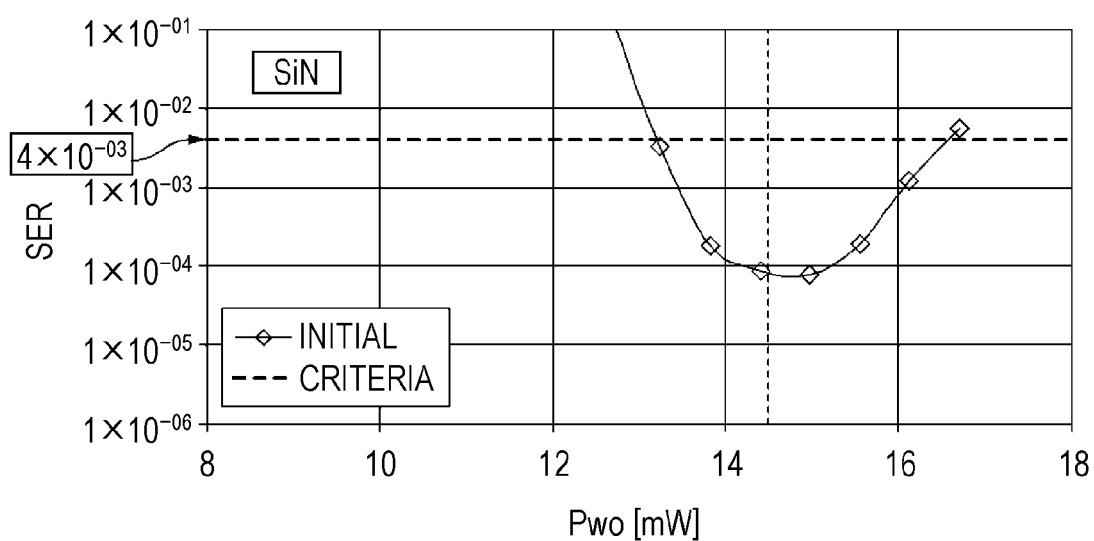

FIG. 1B is a schematic diagram showing a configuration example of each information signal layer shown in FIG. 1A. As shown in FIG. 1B, the information signal layers L0 to L3 are provided with an inorganic recording layer 11 having an upper side surface (second main surface) and a lower side surface (first main surface), a first protective layer 12 provided adjacently to the lower side surface of the inorganic recording layer 11, and a second protective layer 13 provided adjacently to the upper side surface of the inorganic recording layer 11. Through such a configuration, it is possible to improve the durability of the inorganic recording layer 11. Here, out of the two main surfaces of the inorganic recording layer 11, the upper side surface refers to the main surface irradiated with a laser beam for recording or reproducing an information signal and the lower side surface refers to the main surface opposite to the side irradiated with the above-described laser beam, that is, the main surface of the substrate side.

The main component of the inorganic recording layer 11 is preferably an inorganic recording material including Pd oxide (hereinafter referred to as "PdO-based material"). As PdO-based materials, for example, it is possible to use a material having a main component having a two-elemental compound oxide of In oxide and Pd oxide; however, the use of a three-elemental compound oxide of W oxide, Pd oxide and Cu oxide (hereinafter referred to as "WCPO") is preferable and the use of a four-elemental compound oxide in which Zn oxide is further added to the WCPO (hereinafter referred to as "WZCPO") is more preferable. By using WCPO as the PdO-based materials, it is possible to achieve excellent transmission characteristics while satisfying the characteristics asked for the recording layer of the optical information recording medium. By using WZCPO as the PdO-based materials, it is possible to achieve excellent transmission characteristics while satisfying the characteristics asked for the recording layer of the optical information recording medium and it is possible to reduce the content of W oxide, Pd oxide, and Cu oxide. By reducing the content of W oxide, Pd oxide, and Cu oxide, in particular, Pd oxide, it is possible to reduce the cost of the optical information recording medium 10.

It is preferable that at least one layer of the inorganic recording layer 11 among the information signal layers L1 to L3 other than the information signal layer L0 furthest to the back from the light irradiation plane C include WCPO as a main component. The ratio of W, Pd, and Cu included in the WCPO preferably satisfies the relationship $0.17 \leq x_1$, more preferably $0.37 \leq x_1$, still more preferably $0.37 \leq x_1 \leq 1.26$, and most preferably $0.56 \leq x_1 \leq 1.26$. In such a manner, it is possible to achieve excellent transmission characteristics while satisfying the characteristics asked for the information signal layer of the optical information recording medium. Here, the characteristics asked for the information signal layer of the optical information recording medium are, for example, low i-MLSE, wide power margin, high reproduction durability, suppression of changes in transmittance after recording, and the like.

Here, $x_1$ is a variable defined as $x_1 = a/(b+0.8c)$.

a: atomic ratio (atomic %) of W with respect to the total of W, Pd, and Cu b: atomic ratio (atomic %) of Pd with respect to the total of W, Pd, and Cu c: atomic ratio (atomic %) of Cu with respect to the total of W, Pd, and Cu From the viewpoint of increasing the amount of light that reaches the information signal layer L0 furthest to the back from the light irradiation plane C, it is preferable that all of the inorganic recording layers 11 of the information signal layers L1 to L3 other than the information signal layer L0 have a high transmittance.

Further, in addition to the high transmittance, from the viewpoint of securing the characteristics asked for the high transmittance layer even at high transmittance, it is preferable that all of the inorganic recording layers 11 of the information signal layers L0 to L3 include WCPO as a main component. In such a case, the ratio of the W, the Pd, and the Cu that are included in the WCPO preferably satisfies the relationship $0.17 \leq x_1$, more preferably satisfies the relationship $0.37 \leq x_1$, still more preferably satisfies the relationship $0.37 \leq x_1 \leq 1.26$, and most preferably satisfies the relationship $0.56 \leq x_1 \leq 1.26$. Further, the value of the variable $x_1$ of the inorganic recording layer 11 of the information signal layers L0 to L3 is preferably a value as great as that of the information signal layer L close to the light irradiation plane C. The reason is that it is preferable to set the transmittance to be as high as the information signal layer L close to the light irradiation plane C.

The atomic ratio a of W with respect to the total of W, Pd, and Cu is preferably within a range between 10 atomic % and 70 atomic %, and more preferably within a range between 14.2 atomic % and 31.8 atomic %. If the atomic ratio a is less than 10 atomic %, the transmittance tends to be low. On the other hand, if the atomic ratio a exceeds 70 atomic %, the transmittance is high but the recording sensitivity tends to be insufficient.

The atomic ratio b of Pd with respect to the total of the W, the Pd, and the Cu is preferably within a range between 2 atomic % and 50 atomic %, and more preferably within a range between 4.4 atomic % and 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to the total of the W, the Pd, and the Cu is preferably within a range between 10% atomic % and 70% atomic %, and more preferably within a range between 28.5 atomic % and 68.1 atomic %. If the atomic ratio c is less than 10 atomic %, the reproduction durability tends to decrease. On the other hand, if the atomic ratio c exceeds 70 atomic %, the transmittance tends to be low.

It is preferable that the inorganic recording layer 11 of at least one layer out of the information signal layers L1 to L3 other than the information signal layer L0 that is furthest to the back of the light irradiation plane C include WZCPO, in which Zn oxide is added to WCPO, as a main component. The ratio of the W, the Pd, the Cu, and the Zn that are included in the WZCPO preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. In such a manner, it is possible to achieve excellent transmission characteristics while satisfying the characteristics asked for the recording layer of the optical information recording medium and it is possible to reduce the content of W oxide, Pd oxide, and Cu oxide. By reducing the content of W oxide, Pd oxide, and Cu oxide, in particular, Pd oxide included in precious metals, it is possible to reduce the cost of the optical information recording medium 10, where $x_2$ is a variable defined by $x_2 = (0.1d+a)/(b+0.8c)$.

a: atomic ratio (atomic %) of W with respect to the total of W, Pd, Cu, and Zn b: atomic ratio (atomic %) of Pd with respect to the total of W, Pd, Cu, and Zn c: atomic ratio (atomic %) of Cu with respect to the total of W, Pd, Cu, and Zn d: atomic ratio (atomic %) of Zn with respect to the total of W, Pd, Cu, and Zn From the viewpoint of increasing the amount of light that reaches the information signal layer L0 furthest to the back from the light irradiation plane C, it is preferable that all of the inorganic recording layers 11 of the information signal layers L1 to L3 other than the information signal layer L0 have a high transmittance.

Further, in addition to the high transmittance, from the viewpoints of securing the characteristics asked for the high transmittance layer even at high transmittance and reducing the cost of the optical information recording medium, it is preferable that all of the inorganic recording layers 11 of the information signal layers L0 to L3 include WZCPO as a main component. In such a case, the ratio of the W, the Pd, and the Cu that are included in the WZCPO preferably satisfies the relationship $0.17 \leq x_2$, more preferably satisfies the relationship $0.37 \leq x_2$, still more preferably satisfies the relationship $0.37 \leq x_2 \leq 1.26$, and most preferably satisfies the relationship $0.56 \leq x_2 \leq 1.26$. In addition, the value of the variable $x_2$ of the inorganic recording layer 11 of the information signal layers L0 to L4 is preferably a value as great as that of the information signal layer L close to the light irradiation plane C. The reason is that it is possible to increase the transmittance to be as high as the information signal layer L close to the light irradiation plane C.

The atomic ratio a of W with respect to the total of W, Pd, Cu, and Zn is preferably within a range between 10 atomic % and 70 atomic %, and more preferably within a range between 14.2 atomic % and 31.8 atomic %. If the atomic ratio a is less than 10 atomic %, the transmittance tends to be low. On the other hand, if the atomic ratio a exceeds 70 atomic %, the recording sensitivity tends to be insufficient.

The atomic ratio b of Pd with respect to the total of the W, the Pd, the Cu, and the Zn is preferably within a range between 2 atomic % and 50 atomic %, and more preferably within a range between 4.4 atomic % and 32.2 atomic %. If the atomic ratio b is less than 2 atomic %, the recording power margin tends to become narrow. On the other hand, if the atomic ratio b exceeds 50 atomic %, the transmittance tends to be low.

The atomic ratio c of Cu with respect to the total of the W, the Pd, the Cu, and the Zn is preferably within a range between 10% and 70%, and more preferably within a range between 28.5 atomic % and 43.4 atomic %. If the atomic ratio c is less than 10 atomic %, the reproduction durability tends to weaken. On the other hand, if the atomic ratio c exceeds 70 atomic %, the transmittance tends to be low.

The atomic ratio d of Zn with respect to the total of the W, the Pd, the Cu, and the Zn is preferably within a range between 5% and 60%, and more preferably within a range between 17 atomic % and 41 atomic %. If the atomic ratio d is less than 5 atomic %, the cost reducing effect tends to weaken. On the other hand, if the atomic ratio d exceeds 60 atomic %, there is a tendency for storage reliability to deteriorate.

As the material of the information signal layers L1 to L3 other than WCPO or WZCPO, for example, it is also possible to use a material in which the main component is a mixed oxide of In oxide and Pd oxide. However, from the viewpoint of achieving excellent transmission characteristics while satisfying the characteristics asked for the information signal layer of the optical information recording medium, it is preferable to use WCPO or WZCPO.

As the material of the information signal layer L0 furthest to the back from the light irradiation plane C, for example, it is also possible to use a material in which the main component is a mixed oxide of In oxide and Pd oxide. However, from the viewpoint of a wide recording power margin, it is preferable to use the above-described WCPO or WZCPO.

The thickness of the inorganic recording layer 11 is preferably within a range of 25 nm to 60 nm, and more preferably 30 nm to 50 nm. If the thickness is less than 25 nm, there is a tendency for the i-MLSE to deteriorate, the modulation rate to be low and the signal properties to deteriorate. On the other hand, if the thickness exceeds 60 nm, the recording power margin tends to become narrow.

It is preferable to use dielectric layers or transparent conductive layers as the first protective layer 12 and the second protective layer 13, and it is possible to use a dielectric layer for one of the first protective layer 12 and the second protective layer 13 and a transparent conductive layer for the other. Because the dielectric layers or the transparent conductive layers function as oxygen barrier layers, it is possible to improve the durability of the inorganic recording layers 11. Further, by suppressing oxygen from escaping from the inorganic recording layers 11, it is possible to suppress changes (particularly observable as a decrease in the reflectance) in the film quality of the recording film, and it is possible to secure the necessary characteristics of the inorganic recording layers 11. Furthermore, by providing dielectric layers or transparent conductive layers, it is possible to improve the recording properties. It is considered that the reason is that because the thermal diffusion from laser beam that is incident on the dielectric layers or the transparent conductive layers is optimally controlled, bubbles on the recording portions may be suppressed from becoming too large and from popping due to the disintegration of the Pd oxide progressing excessively, whereby it is possible to optimize the shapes of the bubbles during recording.

It is preferable that at least one of the first protective layer 12 and the second protective layer 13 include as a main component the three-elemental compound oxides of Si oxide, In oxide, and Zr oxide ($SiO_2$—$In_2O_3$—$ZrO_2$ is below referred to as "SIZ") as a compound oxide, or the three elemental oxides of In oxide, Ga oxide, and Zn oxide ($In_2O_3$—$Ga_2O_3$—$ZnO$ is below referred to as "IGZO"). In such a manner, it is possible to obtain a favorable power margin. Here, as the materials of the first protective layer 12 and the second protective layer 13, it is possible to adopt the same material or composition ratio; however, without being limited to this example, different materials or composition ratios may be adopted as the materials of the first protective layer 12 and the second protective layer 13. For example, both the first protective layer 12 and the second protective layer 13 may include SIZ or IGZO as a main component; however, without being limited to this example, one of the first protective layer 12 and the second protective layer 13 may include SIZ as a main component and the other may include IGZO as a main component.

In a case where at least one layer of the first protective layer 12 and the second protective layer 13 includes SIZ or IGZO as a main component, it is preferable that, as the inorganic recording layer 11, a layer including WCPO as a main component be adopted and more preferable that a layer including WZCPO, in which Zn oxide is added to WCPO, as a main component be adopted. In a case where the inorganic recording layer 11 has WCPO or WZCPO as a main component, a more favorable power margin may be obtained compared to a case where the inorganic recording layer 11 has a PdO-based material other than WCPO or WZCPO as a main component. In a case where the inorganic recording layer 11 has WZCPO as a main component, it is possible to further obtain the advantage that the optical information recording medium 10 is reduced in cost. The reason for this is that, by making the WCPO further include Zn oxide, it is possible to thin the entirety of the WZCPO with the Zn oxide, and, as a result, decrease the content of Pd, which is a precious metal material.

For at least one layer out of the information signal layers L1 to L3 other than the information signal layer L0 that is furthest to the back of the light irradiation plane C, it is preferable that at least one layer of the first protective layer 12 and the second protective layer 13 adopt a configuration that has SIZ or IGZO as a main component and more preferable that both layers of the first protective layer 12 and the second protective layer 13 adopt a configuration that has SIZ or IGZO as a main component. By adopting such a configuration, the high transmittance may be maintained and it is possible to increase the light quantity of laser beam that reaches the information signal layer L0.

From the viewpoint of maintaining a high light quantity of laser beam that reaches the information signal layer L0, for all the information signal layers L1 to L3 other than the information signal layer L0 that is furthest to the back of the light irradiation plane C, it is preferable that at least one layer of the first protective layer 12 and the second protective layer 13 adopt a configuration that has SIZ or IGZO as a main component and more preferable that both layers of the first protective layer 12 and the second protective layer 13 adopt a configuration that has SIZ or IGZO as a main component.

From the viewpoint of maintaining a high transmittance of the information signal layer L3 closest to the light irradiation plane C, at least one layer of the first protective layer 12 and the second protective layer 13 of the information signal layer L3 preferably has SIZ or IGZO with a low extinction coefficient as a main component and, more preferably, both layers have SIZ or IGZO as a main component. The reason for maintaining the transmittance of the information signal layer L3 closest to the light irradiation plane C in the information signal layers L1 to L3 as high as possible is that, generally, in the balancing of the transmittance and the recording sensitivity which is inversely proportional thereto, when a single layer of the information signal layer L3 is set with a high transmittance and a low recording sensitivity, for a multi-layer layered medium, which is configured by a combination such that the transmittance is set as low as that of the information signal layer far from the light irradiation plane C of one side and the sensitivity of a single layer is high, it is possible to approximately fix the recording sensitivity of each layer set as a multi-layer medium by combining transmittance and sensitivity.

By setting SIZ or IGZO as the main component of one of the first protective layer 12 and the second protective layer 13, it is possible to obtain a favorable power margin; however, from the viewpoint of obtaining an even more favorable power margin, it is preferable that both the first protective layer 12 and the second protective layer 13 include SIZ or IGZO as the main component. When adopting a configuration in which SIZ or IGZO is set as the main component of one of the first protective layer 12 and the second protective layer 13, it is preferable that the first protective layer 12 provided on the lower side surface of the inorganic recording layer 11 have SIZ or IGZO as the main component. By including SIZ or IGZO as the main component in the first protective layer 12 provided on the lower side surface of the inorganic recording layer 11, it is possible to further increase the power margin in comparison to a case in which SIZ or IGZO is included as the main component in the first protective layer 12 provided on the upper side surface of the inorganic recording layer 11.

In the case of a configuration including SIZ or IGZO as the main component of one of the first protective layer 12 and the second protective layer 13, as the material to be set as the main component of the other layer, for example, it is possible to use a dielectric material or a transparent conductive material, specifically, oxides, nitrides, sulfides, carbides, fluorides, or mixtures thereof may be used. As oxides, for example, one or more oxides of chemical elements selected from the group consisting of In, Zn, Sn, Al, Si, Ge, Ti, Ga, Ta, Nb, Hf, Zr, Cr, Bi, and Mg may be exemplified. As the nitrides, for example, one or more nitrides of chemical elements selected from the group consisting of In, Sn, Ge, Cr, Si, Al, Nb, Mo, Ti, Nb, Mo, Ti, W, Ta, and Zn, preferably, one or more nitrides of chemical elements selected from the group consisting of Si, Ge and Ti, may be exemplified. As the sulfides, for example, Zn sulfide may be exemplified. As the carbides, for example, one or more carbides of chemical elements selected from the group consisting of In, Sn, Ge, Cr, Si, Al, Ti, Zr, Ta, and W, preferably, one or more carbides of chemical elements selected from the group consisting of Si, Ti and W, may be exemplified. As the fluorides, for example, one or more fluorides of chemical elements selected from the group consisting of Si, Al, Mg, Ca and La may be exemplified. As mixtures of these, for example, $ZnS—SiO_2$, $SiO_2—Cr_2O_3—ZrO_2$ (SCZ), $In_2O_3—SnO_2$ (ITO), $In_2O_3—CeO_2$ (ICO), $In_2O_3—Ga_2O_3$ (ITO), $Sn_2O_3—Ta_2O_5$ (TTO), $TiO_2—SiO_2$, and the like may be exemplified.

Specifically, it is preferable that SIZ or IGZO be included as the main component of one of the first protective layer 12 and the second protective layer 13 and that ITO be included in the other and it is more preferable that the first protective layer 12 include ITO as a main component and the second protective layer 13 include SIZ or IGZO as a main component. In this manner, a certain amount of the high power margin is sacrificed; however, this is because it is also possible to minimize changes in transmittance after recording. In the case of a multi-layer recording medium, layers other than the innermost layer are information signal layers for transmission and the balance between high transmittance and transmittance variance after recording may be achieved according to the desired characteristics of each layer.

From the viewpoint of the sputtering rate, the In oxide content in SIZ may be 20 mol % or more, and from the viewpoint of storage reliability, is preferably 70 mol % or less. Further, in order that the SI oxide and the Zr oxide function as a compound oxide, amounts of 15 mol % or more and 50 mol % or less are preferable.

The thickness of the first protective layer 12 is preferably within a range of 2 nm to 20 nm. If the thickness is less than 2 nm, there is a tendency for the barrier effect to the recording layer to be reduced. On the other hand, if the thickness exceeds 20 nm, there is a tendency for the recording power margin to be reduced.

The thickness of the second protective layer 13 is preferably within a range of 2 nm to 50 nm. If the thickness is less than 2 nm, there is a tendency for the barrier effect to the recording layer to be reduced. On the other hand, if the thickness exceeds 50 nm, there is a tendency for the recording power margin to be reduced.

As information signal layers L0 to L3, it is preferable that ones having the configurations below be used in combination. The L1 layer, which is close to the innermost layer having small $x_1$ and $x_2$ in composition ratio and asked to have a high sensitivity, is likely to have large transmittance fluctuations after recording as the amounts of Pd and Cu are likely to be large. As a result, it is preferable to use a first protective layer 12 and a second protective layer 13 with an extinction coefficient of 0.05 or more and suppress transmittance fluctuations. Further, in the L3 layer which has large $x_1$ and $x_2$ in composition ratio and has to have a high transmittance, the transmittance fluctuations after recording are small but the power margin is likely to become narrow. As a result, it is preferable to use SIZ and IGZO in the first protective layer 12 and the second protective layer 13 and secure the power margin. Further, when the L2 layer uses a combination of the L1 layer and the L3 layer, it is possible to make the power margin and transmittance fluctuation suppression characteristics of each layer uniform even when the material of the recording layer, the desired sensitivity and the transmittance are different.

(Information Signal Layer L0)
First protective layer 12: ITO
Inorganic recording layer 11: WCPO ($0.4 \leq x_1 \leq 0.6$), preferably WZCPO ($0.4 \leq x_2 \leq 0.6$)
Second protective layer 13: ITO (Information Signal Layer L1)
First protective layer 12: material with an extinction coefficient k in a range of 0.05 to 0.6, preferably ITO
Inorganic recording layer 11: WCPO ($0.5 \leq x_1 \leq 0.9$), preferably WZCPO ($0.5 \leq x_2 \leq 0.9$)
Second protective layer 13: material with an extinction coefficient k in a range of 0.05 to 0.6, preferably ITO (Information Signal Layer L2)
First protective layer 12: material with an extinction coefficient k in a range of 0.05 to 0.6, preferably ITO
Inorganic recording layer 11: WCPO ($0.8 \leq x_1 \leq 1.2$), preferably WZCPO ($0.8 \leq x_2 \leq 1.2$)
Second protective layer 13: SIZ or IGZO (Information Signal Layer L3)
First protective layer 12: SIZ or IGZO
Inorganic recording layer 11: WCPO ($0.8 \leq x_1 \leq 1.2$), preferably WZCPO ($0.8 \leq x_2 \leq 1.2$)
Second protective layer 13: SIZ or IGZO (Intermediate Layer)
The intermediate layers S1 to S3 fulfill a role of separating the L0, L1, L2, and L3 so as to have a sufficient physical and optical distance, are provided with a concavo-convex surface on the surfaces thereof, and form concentric circle or spiral shaped grooves (in-groove Gin and on-groove Gon). The thickness of the intermediate layers S1 to S3 is preferably set to 9 μm to 50 μm, for example, S1=15 μm, S2=20 μm, and S3=10 μm. The material of the intermediate layers S1 to S3 is not particularly limited, but it is preferable to use an ultraviolet curable acrylic resin, in addition, it is preferable that the intermediate layers S1 to S3 have a sufficiently high light transmittance since they will be optical paths for laser beam for the purpose of recording and reproducing data to and from the inner layers.

(Light Transmissive Layer)
The light transmissive layer 2, for example, is a resin layer formed by curing a photosensitive resin such as an ultraviolet curable resin. As the material of such a resin layer, for example, ultraviolet curable acrylic resins may be exemplified. Further, the light transmissive layer 2 may be configured of a light transmitting sheet having a circular shape and an adhesive layer for making the light transmitting sheet adhere to the substrate 1. It is preferable that the light transmitting sheet be material with low absorbance with respect to the laser beam used in recording and reproduction, specifically, a material with a transmittance of 90% or more is preferable. As the material of the light-transmitting sheet, for example, a polycarbonate resin material, a polyolefin resin (for example, ZEONEX (registered trademark)), and the like may be used. As the material of the adhesive layer, for example, an ultraviolet curable resin, a pressure sensitive adhesive (PSA: Pressure Sensitive Adhesive), or the like, may be used.

The thickness of the light transmissive layer 2 is preferably selected from a range of 10 μm to 177 μm, for example, set as 53.5 μm. By combining such a thin light transmissive layer 2 and, for example, an objective lens made to have a high NA (numerical aperture) of approximately 0.85, it is possible to realize high density recording.

(Hard Coat Layer)
The hard coat layer 3 is for conferring anti-scratching properties and the like on the light irradiation plane C. As the material of the hard coat layer 3, for example, an acrylic resin, a silicone resin, a fluorine resin, an organic inorganic hybrid resin, or the like may be used.

(Barrier Layer)
The barrier layer 4 is for suppressing outgassing (moisture release) from the back face of the substrate 1 during the film forming process. Further, the barrier 4 also functions as a moisture-proof layer that suppresses the absorption of moisture on the back face of the substrate 1. Although the material that configures the barrier layer 4 is not particularly limited as long as the outgassing (moisture release) from the back face of the substrate 1 is able to be suppressed, to give an example, a dielectric with low gas transmission may be used. As such a dielectric, for example, SiN, $SiO_2$, TiN, AlN, ZnS—$SiO_2$, or the like may be used. The thickness of the barrier layer 4 is preferably set to between 5 nm and 40 nm. If the thickness is less than 5 nm, the barrier function of suppressing outgassing from the substrate back face tends to decrease. This is because, on the other hand, if the thickness is greater than 40 nm, there is hardly any difference in the barrier function of suppressing outgassing compared to a case when the thickness is lower, and further, productivity tends to decrease. It is preferable that the moisture transmittance of the barrier 4 be equal to or less than $5 \times 10^{-5}$ g/cm² per day.

In the optical information recording medium 10 having the above configuration, when the laser beam is irradiated to the inorganic recording layer 11, Pd oxide is heated and decomposed by the laser beam to release oxygen and bubbles are generated in the parts irradiated with laser beam. In this manner it is possible to irreversibly record the information signal.

[Manufacturing Method of Optical Information Recording Medium]

Next, an example of a manufacturing method of an optical information recording medium according to an embodiment of the present disclosure will be described.

(Formation Process of Substrate)

First, the substrate 1 in which a concavo-convex surface is formed on the principal surface is formed. As the formation method of the substrate 1, for example, an injection method, a photopolymerization method (2P method), and the like may be used.

(Formation Process of Information Signal Layers)

Next, the information signal layer L0 is formed by sequentially laminating the first protective layer 12, the inorganic recording layer 11, and the second protective layer 13 on the substrate 1 by a sputtering method, for example. The formation process of the first protective layer 12, the inorganic recording layer 11, and the second protective layer 13 will be described below in detail.

(Film Forming Process of First Protective Layer)

First, the substrate 1 is transported into a vacuum chamber in which a target for the first protective layer formation, and the inside of the vacuum chamber is vacuumed until the vacuum chamber reaches a predetermined pressure. The first protective layer 12 is then formed on the substrate 1 by sputtering the target while introducing a process gas such as Ar gas or $O_2$ gas into the vacuum chamber. Although a radio frequency (RF) sputtering method or a direct current (DC) sputtering method, for example, may be used as the sputtering method, the direct current sputtering method is particularly preferable. The reason is that since the direct current sputtering method has a high film forming rate compared to the radio frequency sputtering method, it is possible to improve productivity.

(Film Forming Process of Inorganic Recording Layer)

Next, the substrate 1 is transported into a vacuum chamber in which a target for inorganic recording layer film formation use is provided, and the inside of the vacuum chamber is vacuumed until the vacuum chamber reaches a predetermined pressure. The inorganic recording layer 12 is then formed on the first protective layer 11 by sputtering the target while introducing a process gas such as Ar gas or $O_2$ gas into the vacuum chamber.

(Film Forming Process of Second Protective Layer)

Next, the substrate 1 is transported into a vacuum chamber in which a target for second protective layer film formation use is provided, and the inside of the vacuum chamber is vacuumed until the vacuum chamber reaches a predetermined pressure. The second protective layer 13 is then formed on the inorganic recording layer 12 by sputtering the target while introducing a process gas such as Ar gas or $O_2$ gas into the vacuum chamber. As the sputtering method, it is possible to use a high-frequency (RF) sputtering method, a direct current (DC) sputtering method, or the like; however, the direct current sputtering method is preferable. The reason is that since the direct current sputtering method has a high film forming rate compared to the radio frequency sputtering method, it is possible to improve productivity. Thus, the information signal layer L0 is formed on the substrate 1.

(Formation Process of Intermediate Layer)

Next, an ultraviolet curable resin is evenly coated over the information signal layer L0 by a spin coating method, for example. After then pressing the concavo-convex pattern of a stamper on the ultraviolet curable resin that is evenly coated over the information signal layer L0 and curing the resin by irradiating ultraviolet rays on the ultraviolet curable resin, the stamper is removed. In doing so, the concavo-convex pattern of the stamper is transferred on the ultraviolet curable resin, and for example, the intermediate layer S1 on which the in-grooves Gin and the on-grooves Gon are provided is formed over the information signal layer L0.

Here, the target for inorganic recording layer film formation, the target for the first protective layer formation, and the target for second protective layer formation will be described.

(Target for Inorganic Recording Layer Film Formation)

The target for the inorganic recording layer film formation may be a WCP metal target with W, Cu, and Pd as main components, may be a WCPO oxide target with W oxide, Cu oxide, and Pd oxide as main components, and, in consideration of productivity, the use of a metal target, which has main components of W, Cu, and Pd for which DC sputtering capable of a comparatively rapid film formation rate is possible, is preferable. The ratio of W, Pd, and Cu included in the target preferably satisfies a relationship of $0.17 \leq x_1$, more preferably $0.37 \leq x_1$, still more preferably $0.37 \leq x_1 \leq 1.26$, and most preferably $0.56 \leq x_1 \leq 1.26$. In addition, as described above, $x_1$ is a variable defined by $x_1 = a/(b+0.8c)$.

The target for the inorganic recording layer film formation may be a WZPC metal target with W, Cu, Pd, and Zn as main components, may be a WZCPO oxide target with W oxide, Cu oxide, Pd oxide and Zn oxide as main components, and, furthermore, may be a target mixing WZCPO of metal and oxide. In consideration of productivity, the use of a metal target, which has main components of W, Cu, Pd and Zn for which DC sputtering capable of a comparatively rapid film formation rate is possible, is preferable. The ratio of W, Pd, Cu and Zn included in the target preferably satisfies a relationship of $0.17 \leq x_2$, more preferably $0.37 \leq x_2$, still more preferably $0.37 \leq x_2 \leq 1.26$, and most preferably $0.56 \leq x_2 \leq 1.26$. In addition, as described above, the variable $x_2$ is a variable defined by $x_2 = (0.1d+a)/(b+0.8c)$.

As the WCP target for inorganic recording layer film formation, the WCPO target and the WZCP and WZCPO targets, ones having the same composition as the inorganic recording layer 11 are preferable.

(Target for Forming First Protective Layer and Target for Forming Second Protective Layer)

At least one of the target for forming the first protective layer and the target for forming the second protective layer preferably includes SIZ or IGZO as a main component and it is more preferable that both targets include SIZ or IGZO. When one of the target for forming the first protective layer and the target for forming the second protective layer includes SIZ or IGZO as a main component, it is preferable that the target for forming the first protective layer include SIZ or IGZO as a main component. By including SIZ or IGZO as the main component in the first protective layer 12 provided on the lower side surface of the inorganic recording layer 11, it is possible to further increase the power margin in comparison to a case in which SIZ or IGZO is included as the main component in the first protective layer 12 provided on the upper side surface of the inorganic recording layer 11. Further, when SIZ is used, if the amount of highly conductive In oxide is great, DC sputtering becomes possible and productivity becomes high; however, conversely, if the amount of In oxide is too great, the extinction coefficient of thin film becomes great and the transmittance of the information signal layer is lowered. Hence, the In oxide ratio is not particularly limited; however, it is preferable that the ratio be adjusted according to the desired characteristics and productivity of the information signal layer. In addition, in the IGZO, since both In oxide and ZnO oxide have conductivity, when the total amount of In oxide and ZnO oxide is great, DC sputtering is possible and productivity is high, which is thus preferable. However, when the amount of In oxide is too large, for the same reasons mentioned above similarly to SIZ, since the transmittance of the information signal layer deteriorates, it is preferable that the ratio be adjusted according to the desired characteristics of the information signal layer.

(Formation Process of Information Signal Layer and Intermediate Layers)

Next, similarly to the formation process of the information signal layer L0 and the intermediate layer S1 described above, the information signal layer L1, the intermediate layer S2, the information signal layer L2, the intermediate layer S3, and the information signal layer L3 are sequentially laminated over the intermediate layer S1 in such an order. At this time, by adjusting the film formation conditions or the target composition as appropriate, the thicknesses or the compositions of the first protective layer 12, the inorganic recording layer 11, and the second protective layer 13 that configure the information signal layers L1 to L3 may be adjusted as appropriate. Further, by adjusting the conditions of the spin coating method as appropriate, the thicknesses of the intermediate layers S2 to S3 may be adjusted as appropriate.

(Formation Process of Light Transmission Layer)

Next, after spin coating a light-sensitive resin such as an ultraviolet curable resin (UV resin) over the information signal layer L3 by a spin coating method, for example, light such as ultraviolet rays is irradiated on the light-sensitive resin so that the resin is cured. In so doing, the light transmission layer 2 is formed over the information signal layer L3.

The desired optical information recording medium is obtained by the above processes.

EXAMPLES

Below, the present disclosure will be described in detail using test examples; however, the present disclosure is not limited solely to the test examples.

In the following, the information signal layers of the multilayer optical information recording medium will be referred to as the L0 layer, the L1 layer, the L2 layer . . . in order from the substrate side toward the laser irradiation plane side.

The test examples will be described in the following order.
1. Material of the First Protective Layer and the Second Protective Layer
2. PdO Material Other Than WZCPO
3. Forming Position of SIZ Layer
4. Composition of Inorganic Recording Layer
5. Transmittance Range of Two-Layer Optical Information Recording Medium
6. Transmittance Range of Four-Layer Optical Information Recording Medium 1. Material of the First Protective Layer and the Second Protective Layer Test Example 1-1

First, a polycarbonate substrate with a thickness of 1.1 mm was formed by injection molding. Here, a concavo-convex surface with grooves was formed on the polycarbonate substrate. Next, the first protective layer (lower side), the inorganic recording layer, and the second protective layer (upper side) were sequentially laminated over the polycarbonate substrate, thereby forming an L0 layer.

The material, the thickness and the film formation method of each layer of the L0 layer were as follows.
First Protective Layer (Lower Side)
Material: ITO ($SnO_2:In_2O_3$=10:90 (% by mass))
Thickness: 10 nm
Film forming method: DC sputtering
Inorganic Recording Layer
Material: WZCPO (Cu:Zn:Pd:W=30.0:30.0:30.0:10.0 (atomic ratio (atomic %)))
Thickness: 30 nm
Film formation method: DC sputtering ($O_2$ reactive sputtering)
Second Protective Layer (Upper Side)
Material: ITO ($SnO_2:In_2O_3$=10:90 (% by mass))
Thickness: 10 nm
Film formation method: DC sputtering method Next, ultraviolet curable resin (manufactured by Sony Chemical & Information Device Corporation, product name: SK5500B) was uniformly coated over the L0 layer by spin coating. After then pressing the concavo-convex pattern of a stamper on the ultraviolet curable resin that was evenly coated over the information signal layer L0 and curing the resin by irradiating ultraviolet rays on the ultraviolet curable resin, the stamper was removed. In this manner, an intermediate layer having grooves and a thickness of 15.5 µm was formed.

Next, the first protective layer, the inorganic recording layer, and the second protective layer were sequentially stacked on the intermediate layer, thereby forming the L2 layer. Furthermore, the formation of the L1 layer was omitted.

The material of each layer of layer L2, the thickness and the film formation method were as follows.
First Protective Layer (Lower Side)
Material: SIZ ($SiO_2:In_2O_3:ZrO_2$=35:30:35 (mol %))
Thickness: 10 nm
Film forming method: RF sputtering method
Inorganic Recording Layer
Material: WZCPO (Cu:Zn:Pd:W=35.0:25.0:10.0:30.0 (atomic ratio (atomic %)))
Film formation method: DC sputtering ($O_2$ reactive sputtering)
Thickness: 40 nm
Second Protective Layer (Upper Side)
Material: SIZ ($SiO_2:In_2O_3:ZrO_2$=35:30:35 (mol %))
Thickness: 25 nm
Film formation method: RF sputtering method Next, an ultraviolet curable resin was evenly coated over the L2 layer by a spin coating method and cured by the irradiation of ultraviolet rays, whereby a resin layer having the same hardness as the intermediate layer and a thickness of 31.0 µm was formed.

Next, by evenly coating an ultraviolet curable resin (manufactured by Sony Chemical & Information Device Corporation, product name: SK8300) over the L1 layer by a spin coating method and curing the resin by irradiating ultraviolet rays, a light transmissive layer with a thickness of 53.5 µm was formed.

In this manner, a two-layer optical information recording medium having an L0 layer and an L2 layer was obtained. In such a two-layer optical information recording medium, by forming the resin layer between the L2 layer and the light transmissive layer, the L2 layer state is set to the state of the L2 layer of a four-layer optical information recording medium in a simulated manner.

Test Example 1-2

An optical information recording medium was obtained in the same manner as in Test Example 1-1 apart from the materials, thicknesses and film formation methods of the first protective layer and the second protective layer of layer L2 as shown below.

First Protective Layer (Lower Side)
Material: SIZ ($SiO_2:In_2O_3:ZrO_2=30:40:30$ (mol %))
Thickness: 10 nm
Film forming method: DC sputtering method
Second Protective Layer (Upper Side)
Material: SIZ ($SiO_2:In_2O_3:ZrO_2=30:40:30$ (molar ratio))
Thickness: 25 nm
Film forming method: DC sputtering method Test Example 1-3

An optical information recording medium was obtained in the same manner as in Test Example 1-1 apart from the materials, thicknesses and film formation methods of the first protective layer and the second protective layer of layer L2 as shown below.
First Protective Layer (Lower Side)
Material: IGZO ($In_2O_3:Ga_2O_3:ZnO=25:25:50$ (mol %))
Thickness: 10 nm
Film forming method: DC sputtering method
Second Protective Layer (Upper Side)
Material: IGZO ($In_2O_3:Ga_2O_3:ZnO=25:25:50$ (mol %))
Thickness: 25 nm
Film forming method: DC sputtering method Test Example 1-4

An optical information recording medium was obtained in the same manner as in Test Example 1-1 apart from the materials, thicknesses and film formation methods of the first protective layer and the second protective layer of layer L2 as shown below.
First Protective Layer (Lower Side)
Material: ITO ($SnO_2:In_2O_3=10:90$ (% by mass))
Thickness: 10 nm
Film forming method: DC sputtering method
Second Protective Layer (Upper Side)
Material: ITO ($SnO_2:In_2O_3=10:90$ (% by mass))
Thickness: 25 nm
Film forming method: DC sputtering method Test Example 1-5

An optical information recording medium was obtained in the same manner as in Test Example 1-1 apart from the materials, thicknesses and film formation methods of the first protective layer and the second protective layer of layer L2 as shown below.
First Protective Layer (Lower Side)
Material: Si
Thickness: 10 nm
Film forming method: DC sputtering method ($N_2$ reactive sputtering)
Second Protective Layer (Upper Side)
Material: Si
Thickness: 25 nm
Film forming method: DC sputtering method ($N_2$ reactive sputtering)

(Initial State Power Margin)

The initial state of the power margin of the L2 layer of the optical information recording media of Test Examples 1-1 to 1-5 obtained in the above-described manner was calculated as below. Using a disc tester (manufactured by Pulstec Industrial Co., Ltd., product name: ODU-1000), 1-7 modulation data with a density of 32 GB per layer was recorded and reproduced with a recording wavelength of 405 nm and a recording linear velocity of 7.69 m/s, and the random symbol error rate (SER) was calculated. Such an SER was calculated with respect to the recording power, a low side with recording power in excess of $4\times10^{-3}$ was set as Pwl, a high side was set as Pwh, and the optimal power between Pwl and Pwh was set as Pwo. At this time, the power margin PM was calculated from Formula 1 below. Here, an SER of $4\times10^{-3}$ is the upper limit value of the SER at which error correction does not fail. If the upper limit value is exceeded, defects are generated in the reproduction data and the signal quality particularly deteriorates.

$$PM=(Pwh-Pwl)/Pwo \qquad (1)$$

The results thereof are shown in FIGS. 2A to 4B and Table 1.

Table 1 shows the evaluation results of the optical information recording media of Test Examples 1-1 to 1-5.

TABLE 1

| | Test Example 1-1 | Test Example 1-2 | Test Example 1-3 | Test Example 1-4 | Test Example 1-5 |
| --- | --- | --- | --- | --- | --- |
| First Protective Layer/Second Protective Layer | SIZ/SIZ | SIZ/SIZ | IGZO/IGZO | ITO/ITO | SiN/SiN |
| Power Margin (SER) [%] | >32 | >31 | >30 | 20 | >24 |
| Film Formation Method | RF | DC | DC | DC | RF |
| Refraction Rate | 1.89 | 2.03 | 2.06 | 2.23 | 1.89 |

SIZ: $SiO_2$—$In_2O_3$—$ZrO_2$
IGZO: $In_2O_3$—$Ga_2O_3$—$ZnO$
RF: a radio frequency sputtering method
DC: a direct current sputtering method The following may be understood from Table 1.

By using SIZ or IGZO as the material of the first protective layer and the second protective layer, the power margin may be set as 30% or more. Here, when the power margin is 30%, it is possible to sufficiently absorb the influence of the precision of the recording power of a consumer drive, variation of in-plane sensitivity of the optical information recording medium, temperature of the optical information recording medium, and a decrease in the actual recording power accompanying warping due to humidity, thereby enabling favorable recording with a low error rate. When SIZ is used as the material of the first protective layer and the second protective layer, it is possible to further widen the power margin in comparison to a case where IGZO is used.

By using SIZ or IGZO as the material of the first protective layer and the second protective layer, it is possible to improve the transmittance of the information signal layer. Accordingly, it is possible to increase the light quantity of the laser beam reaching the L0 layer positioned furthest to the back of the light irradiation plane.

By setting the content of In oxide with respect to SIZ to a range of 40 mol % or more and reducing the electric resistance of the target, it is possible to perform film formation by a DC sputtering method. Accordingly, it is possible to improve the film formation rate and improve productivity.

According to the above, in order to improve the power margin and maintain a high transmittance, it is preferable to use SIZ and IGZO as the material of the first protective layer and the second protective layer adjacent to the inorganic recording layer and particularly preferable to use IGZO.

Further, in order to increase productivity, it is preferable that the content ratio of In oxide with respect to SIZ be set to 40 mol % or more; however, since the transmittance of the information signal layer deteriorates due to the extinction coefficient of the SIZ thin layer becoming large when such a content ratio is excessive, it is preferable to select the ratio of the In oxide and the like in accordance with the transmittance and productivity desired for the information signal layer.

2. PdO Material Other than WZCPO

Test Example 2

First, a polycarbonate substrate with a thickness of 1.1 mm was formed by injection molding. Here, a concavo-convex surface with grooves was formed on the polycarbonate substrate. Next, the first protective layer (lower side), the inorganic recording layer, and the second protective layer (upper side) were sequentially laminated over the polycarbonate substrate, thereby forming an L0 layer.

The material, the thickness and the film formation method of each layer of layer L0 were as follows.
　First Protective Layer (Lower Side)
　Material: ITO ($SnO_2$:$In_2O_3$=10:90 (% by mass))
　Thickness: 8 nm
　Film forming method: DC sputtering method
　Inorganic Recording Layer
　Material: $In_2O_3$—PdO (In:Pd=50:50 (atomic ratio (atomic %)))
　Film forming method: DC sputtering ($O_2$ reactive sputtering)
　Thickness: 40 nm
　Second Protective Layer (Upper Side)
　Material: ITO ($SnO_2$:$In_2O_3$=10:90 (% by mass))
　Thickness: 10 nm
　Film forming method: DC sputtering method Next, ultraviolet curable resin (manufactured by Sony Chemical & Information Device Corporation, product name: SK5500B) was uniformly coated over the L0 layer by spin coating. After then pressing the concavo-convex pattern of a stamper on the ultraviolet curable resin that was evenly coated over the information signal layer L0 and curing the resin by irradiating ultraviolet rays on the ultraviolet curable resin, the stamper was removed. In this manner, an intermediate layer having grooves and a thickness of 15.5 μm was formed.

Then, by sequentially laminating the first protective layer (lower side), the inorganic recording layer, and the second protective layer (upper side) on the intermediate layer, layer L1 was formed.

The material, the thickness and the film formation method of each layer of layer L1 were as follows.
　First Protective Layer (Lower Side)
　Material: ITO ($SnO_2$:$In_2O_3$=10:90 (% by mass))
　Thickness: 10 nm
　Film forming method: DC sputtering method
　Inorganic Recording Layer
　Material: $In_2O_3$—PdO (In:Pd=70:30 (atomic ratio (atomic %)))
　Film forming method: DC sputtering ($O_2$ reactive sputtering)
　Thickness: 40 nm
　Second Protective Layer (Upper Side)
　Material: ITO ($SnO_2$:$In_2O_3$=10:90 (% by mass))
　Thickness: 10 nm
　Film forming method: DC sputtering method Next, ultraviolet curable resin (manufactured by Sony Chemical & Information Device Corporation, product name: SK5500B) was uniformly coated over the L1 layer by spin coating. After then pressing the concavo-convex pattern of a stamper on the ultraviolet curable resin that was evenly coated over the information signal layer L1 and curing the resin by irradiating ultraviolet rays on the ultraviolet curable resin, the stamper was removed. In this manner, an intermediate layer having grooves and a thickness of 19.5 μm was formed.

Then, by sequentially laminating the first protective layer (lower side), the inorganic recording layer, and the second protective layer (upper side) on the intermediate layer, layer L2 was formed.

The material, the thickness and the film formation method of each layer of layer L2 were as follows.
　First Protective Layer (Lower Side)
　Material: ITO ($SnO_2$:$In_2O_3$=10:90 (% by mass))
　Thickness: 10 nm
　Film forming method: DC sputtering method
　Inorganic Recording Layer
　Material: $In_2O_3$—PdO (In:Pd=70:30 (atomic ratio (atomic %)))
　Film forming method: DC sputtering ($O_2$ reactive sputtering)
　Thickness: 40 nm
　Second Protective Layer (Upper Side)
　Material: SIZ ($SiO_2$:$In_2O_3$:$ZrO_2$=40:30:40 (mol %))
　Thickness: 10 nm
　Film forming method: RF sputtering method Next, ultraviolet curable resin (manufactured by Sony Chemical & Information Device Corporation, product name: SK5500B) was uniformly coated over the L2 layer by spin coating. After then pressing the concavo-convex pattern of a stamper on the ultraviolet curable resin that was evenly coated over the information signal layer L2 and curing the resin by irradiating ultraviolet rays on the ultraviolet curable resin, the stamper was removed. In this manner, an intermediate layer having grooves and a thickness of 11.5 μm was formed.

Then, by sequentially laminating the first protective layer (lower side), the inorganic recording layer, and the second protective layer (upper side) on the intermediate layer, the L3 layer was formed.

The material, the thickness and the film formation method of each layer of the L3 layer were as follows.
　First Protective Layer (Lower Side)
　Material: SIZ ($SiO_2$:$In_2O_3$:$ZrO_2$=40:30:40 (mol %))
　Thickness: 10 nm
　Film forming method: RF sputtering method
　Inorganic Recording Layer
　Material: $In_2O_3$—PdO (In:Zn:Sn:Pd=70:30 (atomic ratio (atomic %)))
　Film forming method: DC sputtering method ($O_2$ reactive sputtering)
　Thickness: 40 nm
　Second Protective Layer (Upper Side)

Material: SIZ ($SiO_2:In_2O_3:ZrO_2=40:30:40$ (mol %))
Thickness: 10 nm
Film forming method: RF sputtering method Next, by evenly coating an ultraviolet curable resin (manufactured by Sony Chemical & Information Device Corporation, product name: SK8300) over the L3 layer by a spin coating method and curing the resin by irradiating ultraviolet rays, a light transmission layer with a thickness of 53.5 μm was obtained. In this manner, a desired optical information recording medium was obtained.

(Power Margin)

The initial state of the power margin of layers L1 to L3 of the optical information recording medium of Test Example 2 obtained in the above-described manner was calculated in the same manner as Test Examples 1-1 to 1-5. The results are shown in FIG. 5.

Figure 5:
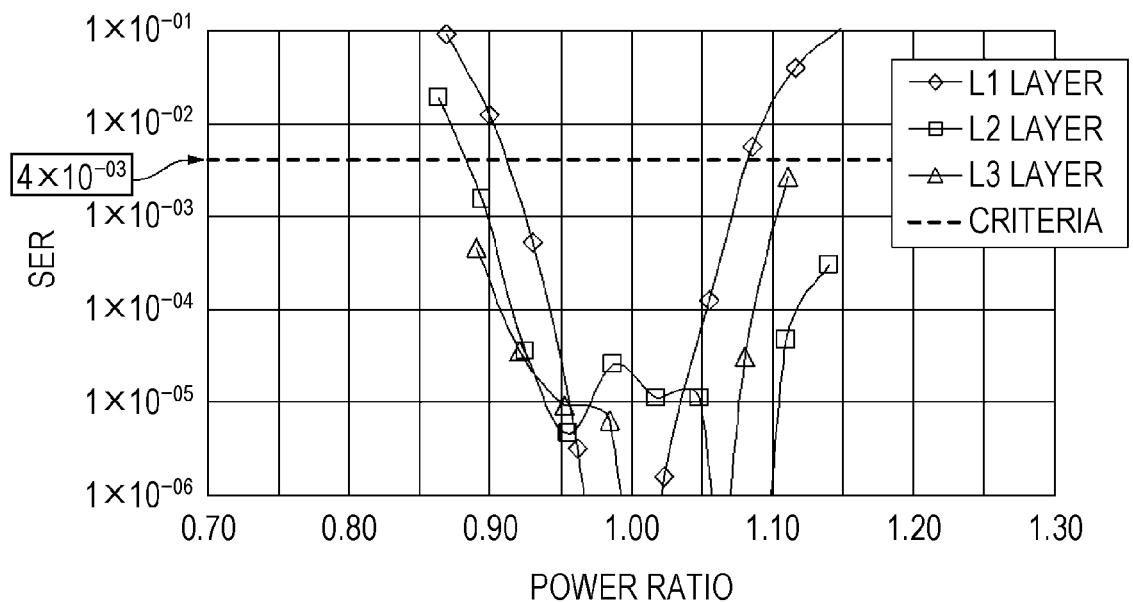
FIG. 5 is a graph showing the power margin of the optical information recording medium in Test Example 2.

The following may be understood from FIG. 5.

Even in a case where PdO-based material other than WZCPO is used in the inorganic recording layer, by using a SIZ layer on the surface of the inorganic recording layer, it is possible to widen the power margin in comparison with a case in which an ITO layer is used. Here, by using ITO only for the first protective layer (lower side) and SIZ on the second protective layer (upper side) for the L2 layer and using SIZ for both the upper and lower protective layers in the L3 layer in contrast to the L1 layer which uses ITO for both the upper and lower protective layers, it may be understood that the power margin is widened in order of L1, L2, and L3. Thus, it may be understood that SIZ has an effect on the high recording power margin. However, the case in which the WZCPO layer and the SIZ layer are combined has a greater degree of improvement in the power margin.

Here, only the case where an SIZ layer is used as a first protective layer and a second protective layer is shown; however, it is considered that the same effect may be obtained even in a case of using an IGZO layer as the first protective layer and the second protective layer.

3. Forming Position of SIZ Layer

Test Example 3-1

An optical information recording medium was obtained in the same manner as in Test Example 1-4.

Test Example 3-2

An optical information recording medium was obtained in the same manner as in Test Example 3-1 apart from the materials, thicknesses and film formation methods of the first protective layer and the second protective layer of layer L2 as shown below.
First Protective Layer (Lower Side)
Material: SIZ ($SiO_2:In_2O_3:ZrO_2=40:30:40$ (mol %))
Thickness: 10 nm
Film forming method: RF sputtering method Test Example 3-3

An optical information recording medium was obtained in the same manner as in Test Example 3-1 apart from the materials, thicknesses and film formation methods of the first protective layer and the second protective layer of layer L2 as shown below.
Second Protective Layer (Upper Side)
Material: SIZ ($SiO_2:In_2O_3:ZrO_2=40:30:40$ (mol %))
Thickness: 25 nm
Film forming method: RF sputtering method Test Example 3-4

An optical information recording medium was obtained in the same manner as in Test Example 1-1.
(Power Margin)

The initial state of the power margin of layer L2 of the optical information recording media of Test Examples 3-1 to 3-4 obtained in the above-described manner was calculated in the same manner as Test Examples 1-1 to 1-5. The results are shown in FIG. 6.

Figure 6:
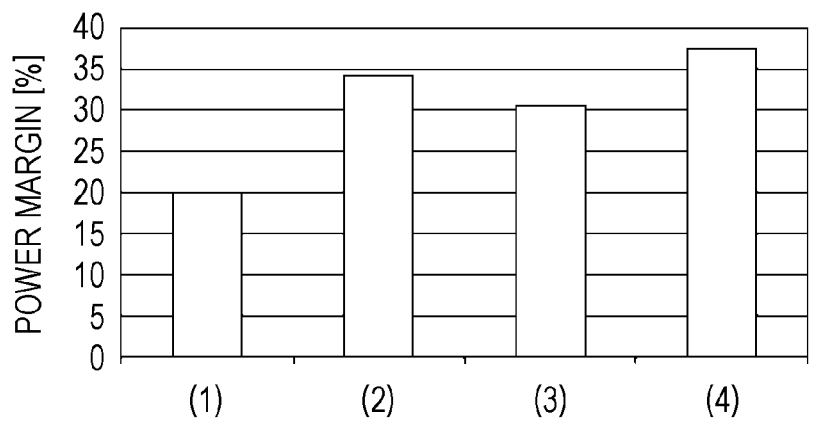
FIG. 6 is a graph showing the power margin of the optical information recording media in Test Examples 3-3 to 3-4.

The following may be understood from FIG. 6.

In a case where SIZ is used as the material of one of the first protective layer and the second protective layer, it is possible to improve the power margin in comparison to a case where ITO is used as the material of both the first protective layer and the second protective layer.

When SIZ is used as the material of the first protective layer (lower side), it is possible to improve the power margin in comparison to a case where SIZ is used as the material of the second protective layer (upper side).

When SIZ is used as the material of both the first protective layer and the second protective layer, it is possible to improve the power margin in comparison to a case where SIZ is used as the material of one of the first protective layer and the second protective layer.

Thus, from the viewpoint of obtaining a favorable power margin, it is preferable that SIZ be used as the material of one of the first protective layer and the second protective layer, in particular, as the material of the first protective layer (lower side) and more preferable that SIZ be used as the material of both the first protective layer and the second protective layer.

Here, only the case where an SIZ layer is used as the first protective layer and/or the second protective layer has been shown; however, it is considered that the same effect may be obtained even in a case of using an IGZO layer as the first protective layer and the second protective layer.

4. Composition of Inorganic Recording Layer

Test Examples 4-1 to 4-15

First, a polycarbonate substrate with a thickness of 1.1 mm was formed by injection molding. Here, a concavo-convex surface with grooves was formed on the polycarbonate substrate. Next, the first protective layer, the inorganic recording layer, and the second protective layer were sequentially laminated over the polycarbonate substrate by the sputtering method. The specific configurations of each layer were as follows.
First Protective Layer
Material: SIZ, thickness: 10 nm
Inorganic Recording Layer
Material: WZCPO, thickness: 40 nm
Second Protective Layer
Material: SIZ, thickness: 10 nm However, the target compositions were manufactured for each of Test Examples 4-1 to 4-15 so that the atomic ratios c, d, b, and a of each of Cu, Zn, Pd and W in the WZCPO of the inorganic recording layer became the values shown in Table 2.

Next, by evenly coating an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was obtained.

In this manner, a desired optical information recording medium was obtained.

(Transmittance Evaluation)

The transmittances of the optical information recording media of Test Examples 4-1 to 4-15 obtained as described above with respect to a recording wavelength of 405 nm were measured using a spectrophotometer (manufactured by JASCO Corporation, product name: V-530). The results are shown in Table 2.

Figure 7A:
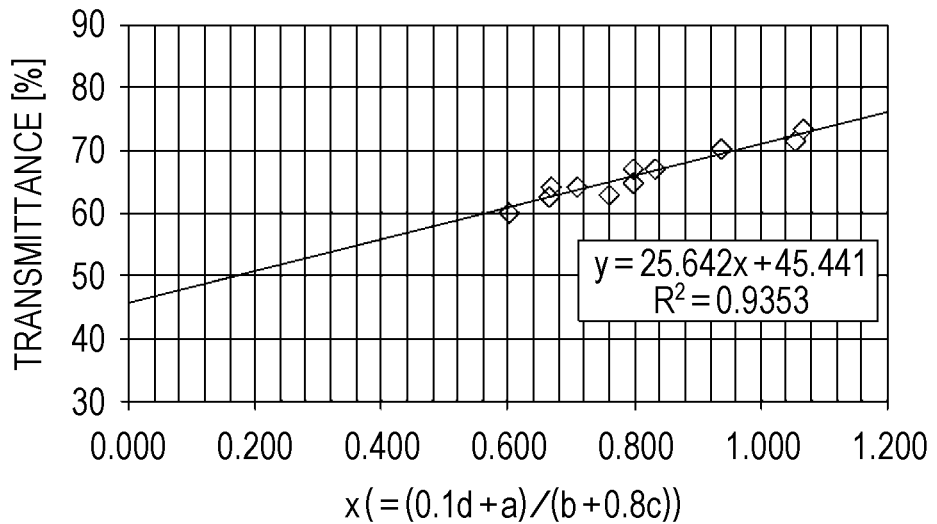
FIG. 7A is a graph showing the relationship between the variable x and the transmittance in the optical information recording media of Test Examples 4-1 to 4-13 and FIG. 7B is a graph showing the relationship between the transmittance and the optimal recording power Pwo in the optical information recording media of Test Examples 4-1 to 4-13.

Next, as a way of making the linear approximation, using the measured transmittances and the atomic ratios c, d, b, and a, each coefficient was determined by multiplying a coefficient by each ratio so that the square of a determination coefficient R is the greatest with the sum of each ratio of the W oxide and the Zn oxide with relatively small extinction coefficients as the numerator and the sum of each ratio of the Pd oxide and the Cu oxide with relatively large extinction coefficients as the denominator. The results are shown in FIG. 7A. In FIG. 7A, the horizontal axis indicates the variable $x(=0.1d+a)/(b+0.8c))$, and the vertical axis indicates the transmittance. As illustrated in FIG. 7A, the linear approximation is represented by $y=25.642x+45.441$. Here, y indicates the transmittance [%] and x indicates $(0.1d+a)/(b+0.8c)$.

(Optimum Recording Power Evaluation)

Figure 7B:
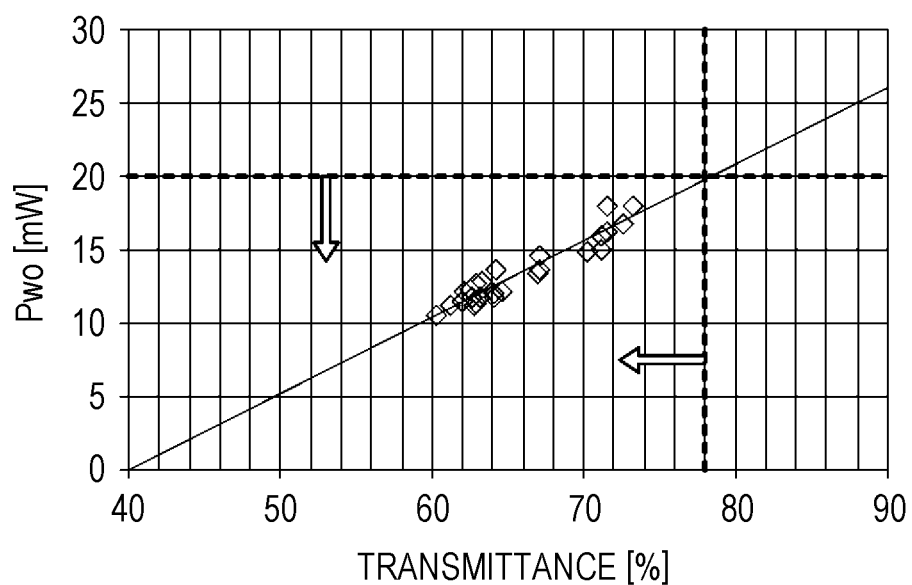

Using a disc tester (manufactured by Pulstec Industrial Co., Ltd., product name: ODU-1000), 1-7 modulation data with a density of 32 GB per layer was recorded and reproduced with a recording wavelength of 405 nm and a recording linear velocity of 7.69 m/s to calculate the recording power at which the i-MLSE value is the smallest, and such a recording power was taken as the optimum recording power Pwo. The results are illustrated in FIG. 7B.

Figure 8:
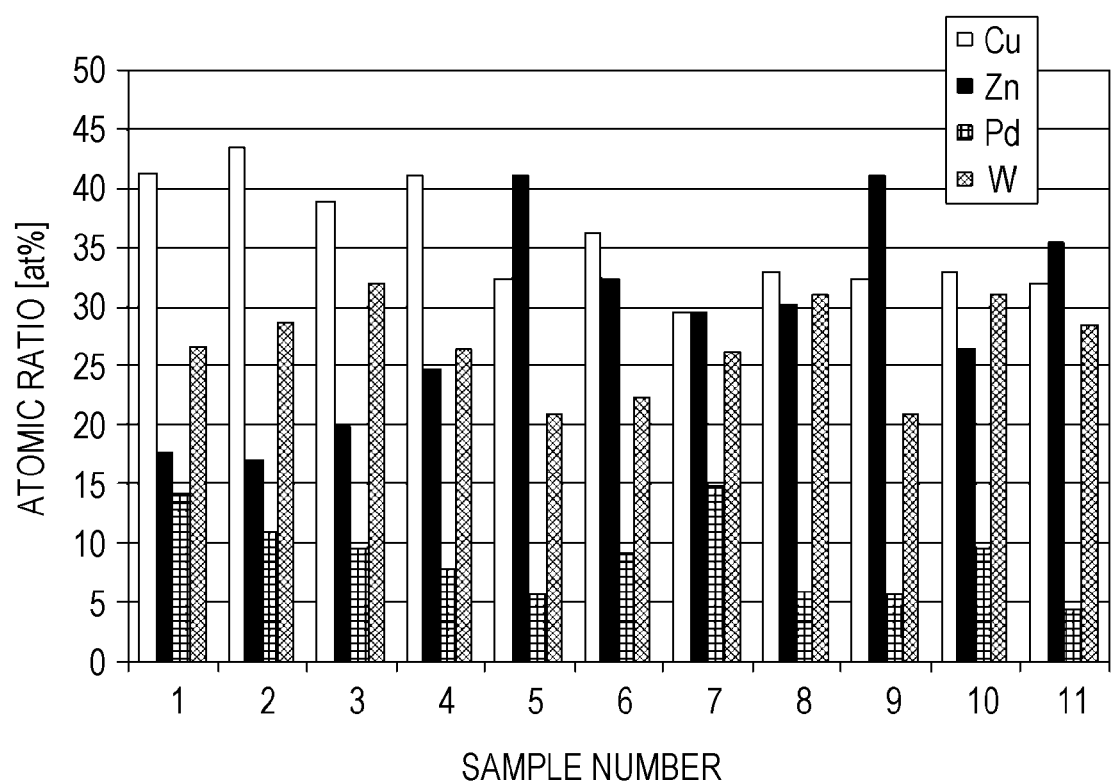
FIG. 8 is a graph showing the composition ratio of the inorganic recording layer in the optical information recording media of Test Examples 4-1 to 4-13.

Table 2 illustrates the composition ratios and the transmittances of the inorganic recording layers of Test Examples 4-1 to 4-15. FIG. 8 is a graph that illustrates the composition ratios of the inorganic recording layers of Test Examples 4-1 to 4-13.

For the transmittance to be equal to or greater than 55%, it is preferable that the variable x be equal to or greater than 0.37.

For the transmittance to be equal to or greater than 60%, it is preferable that the variable x be equal to or greater than 0.56.

For the transmittance to be equal to or greater than 78%, it is preferable that the variable x be equal to or less than 1.26.

Here, in a multi-layer optical information recording medium, it is preferable that the transmittances of information signal layers equal to or higher than the L1 layer (L1 layer, L2 layer, L3 layer, . . . ) be equal to or greater than 55%. The reason why a transmittance equal to or greater than 55% is preferable will be described later. Here, with a two-layer disc using a recording film composition other than WZCPO (ZnS—SiO$_2$—Sb—Sn, TePdO, and the like), in order to increase the reflectance of the L0 layer, it is preferable that the transmittance of the L1 layer be equal to or greater than 50%.

The following may be understood from the linear approximation illustrated in FIG. 7B.

It is seen that for the optimum recording power Pwo to be equal to or less than 20 mW, it is preferable that the transmittance be equal to or less than 78%. Here, the optimum recording power Pwo: 20 mW is the upper limit value of the optimum recording power Pwo of a consumer drive device. If the upper limit value is exceeded, the recording power becomes insufficient and the signal properties deteriorate.

5. Transmittance Range of Two-Layer Optical Information Recording Medium

Test Examples 5-1 to 5-12

First, a polycarbonate substrate with a thickness of 1.1 mm was formed by injection molding. Here, a concavo-convex surface with grooves was formed on the polycarbonate substrate.

Next, the first protective layer, the inorganic recording layer, and the second protective layer were sequentially laminated over the polycarbonate substrate by the sputtering

TABLE 2

|  | Atomic ratio c of Cu [Atomic %] | Atomic ratio d of Zn [Atomic %] | Atomic ratio b of Pd [Atomic %] | Atomic ratio a of W [Atomic %] | x, (0.1d + a)/ (b + 0.8c) | Transmittance [%] |
|---|---|---|---|---|---|---|
| Test Example 4-1 | 41.3 | 17.7 | 14.3 | 26.7 | 0.601 | 60 |
| Test Example 4-2 | 43.4 | 17 | 10.9 | 28.7 | 0.666 | 62.6 |
| Test Example 4-3 | 38.8 | 19.8 | 9.6 | 31.8 | 0.831 | 66.9 |
| Test Example 4-4 | 41.1 | 24.7 | 7.8 | 26.4 | 0.710 | 64.1 |
| Test Example 4-5 | 32.4 | 41 | 5.6 | 21 | 0.796 | 67.1 |
| Test Example 4-6 | 36.3 | 32.4 | 9.1 | 22.2 | 0.667 | 64.1 |
| Test Example 4-7 | 29.5 | 29.5 | 14.8 | 26.2 | 0.759 | 63 |
| Test Example 4-8 | 33 | 30.1 | 5.9 | 31 | 1.053 | 71.6 |
| Test Example 4-9 | 32.4 | 41 | 5.6 | 21 | 0.796 | 64.87 |
| Test Example 4-10 | 33 | 26.5 | 9.5 | 31 | 0.937 | 70.1 |
| Test Example 4-11 | 31.9 | 35.3 | 4.4 | 28.4 | 1.067 | 73.3 |
| Test Example 4-12 | 28.5 | 25 | 32.2 | 14.2 | 0.304 | 73.3 |
| Test Example 4-13 | 68.1 | 0 | 25.5 | 16.4 | 0.205 | 73.3 |
| Test Example 4-14 | 58.11 | 0 | 25.5 | 16.39 | 0.228 | 51.28 |
| Test Example 4-15 | 28.48 | 25.09 | 32.2 | 14.24 | 0.305 | 53.25 |

The following may be understood from the linear approximation illustrated in FIG. 7A.

For the transmittance to be equal to or greater than 50%, it is preferable that the variable x be equal to or greater than 0.17.

method, whereby an L0 layer was produced. Here, the L0 layer is for use as a two-layer optical information recording medium.

The specific configurations of each layer were as follows.
First Protective Layer
Material: ITO, thickness: 10 nm
Inorganic Recording Layer Material: WZCPO, thickness: 26 nm to 30 nm
Composition ratio: a=10, b=30, c=30, and d=30
Second Protective Layer
Material: TaN, thickness: 6 nm to 16 nm However, the film formation conditions were manufactured for each of Test Examples 5-1 to 5-12 so that the thicknesses of the inorganic recording layer and the second protective layer became the values shown in Table 3.

Next, by evenly coating an ultraviolet curable resin (manufactured by Sony Chemical & Information Device Corporation, product name: SK8300) over the second protective layer by a spin coating method and curing the resin by irradiating ultraviolet rays, a light transmission layer with a thickness of 100 μm was formed.

In this manner, an optical information recording medium having only an L0 layer was obtained.

(i-MLSE Evaluation)

The i-MLSE of the optical information recording media of Test Examples 5-1 to 5-12 obtained as described above was calculated as below. Using a disc tester (manufactured by Pulstec Industrial Co., Ltd., product name: ODU-1000), the i-MLSE value was calculated by recording and reproducing 1-7 modulation data with a density of 32 GB per layer with NA=0.85, a recording wavelength of 405 nm, and a recording linear velocity of 7.69 m/s.

(Reflectance Evaluation)

The reflectances of the optical information recording media of Test Examples 5-1 to 5-12 obtained as described above were measured using a disc tester (manufactured by Pulstec Industrial Co., Ltd., product name: ODU-1000), with NA=0.85 and a recording wavelength of 405 nm. Here, the reflectance of a single-layer optical information recording medium manufactured using only the L0 layer of a two-layer optical information recording medium is referred to as the reflectance of the L0 layer alone.

Table 3 shows the measurement results of the i-MLSE and reflectances of the optical information recording media of the Test Examples 5-1 to 5-12.

recording layer, and the second protective layer to be thinner than the above film thicknesses, the i-MLSE values would then deteriorate. It is presumed that the i-MLSE values deteriorate since the formation of bubbles during recording becomes inappropriate as a result of changes in the heat accumulation or heat release of the inorganic recording layer.

Test Examples 5-13 to 5-24

With a reflectance of the L0 layer alone calculated as described above of 14% as the premise, the reflectance of the L0 layer with respect to the transmittance of the L1 layer of a two-layer optical information recording medium was calculated by the calculation. The results are illustrated in Table 4 and FIG. 9B. Here, if the transmittance of L1 is T and the reflectance of the L0 layer is R, R is calculated by Formula 2 below.

$$R = 14\% (\text{reflectance of } L0 \text{ layer alone}) \times T^2 \quad (2)$$

Table 4 illustrates the reflectances of the L0 layers alone, the transmittances of the L1 layers, and the reflectances of the L0 layers of the optical information recording media of Test Examples 5-13 to 5-24.

TABLE 4

|  | Reflectance of L0 Layer alone (%) | Transmittance of L1 Layer (%) | Reflectance of L0 Layer (%) |
|---|---|---|---|
| Test Example 5-13 | 14 | 30 | 1.3 |
| Test Example 5-14 | 14 | 35 | 1.7 |
| Test Example 5-15 | 14 | 40 | 2.2 |
| Test Example 5-16 | 14 | 45 | 2.8 |
| Test Example 5-17 | 14 | 50 | 3.5 |
| Test Example 5-18 | 14 | 55 | 4.2 |
| Test Example 5-19 | 14 | 60 | 5.0 |
| Test Example 5-20 | 14 | 65 | 5.9 |
| Test Example 5-21 | 14 | 70 | 6.9 |
| Test Example 5-22 | 14 | 75 | 7.9 |
| Test Example 5-23 | 14 | 80 | 9.0 |
| Test Example 5-24 | 14 | 85 | 10.1 |

TABLE 3

|  | Material of First Protective Layer | Thickness of First Protective Layer (nm) | Material of Recording Layer | Thickness of Recording film (nm) | Material of Second Protective Layer | Thickness of Second Protective Layer (nm) | Reflectance (%) | i-MLSE (%) |
|---|---|---|---|---|---|---|---|---|
| Test Example 5-1 | ITO | 10 | WZCPO | 30 | TaN | 12 | 12.5 | 10.6 |
| Test Example 5-2 |  | 10 |  | 28 |  | 12 | 13.4 | 10.6 |
| Test Example 5-3 |  | 10 |  | 26 |  | 12 | 14.3 | 11.1 |
| Test Example 5-4 |  | 10 |  | 30 |  | 10 | 12.6 | 10.3 |
| Test Example 5-5 |  | 10 |  | 28 |  | 10 | 12.9 | 10.4 |
| Test Example 5-6 |  | 10 |  | 26 |  | 10 | 14.1 | 11.0 |
| Test Example 5-7 |  | 10 |  | 30 |  | 8 | 12.3 | 10.3 |
| Test Example 5-8 |  | 10 |  | 28 |  | 8 | 12.8 | 10.2 |
| Test Example 5-9 |  | 10 |  | 26 |  | 8 | 13.1 | 10.8 |
| Test Example 5-10 |  | 10 |  | 26 |  | 6 | 11.5 | 9.8 |
| Test Example 5-11 |  | 10 |  | 26 |  | 14 | 15.2 | 11.6 |
| Test Example 5-12 |  | 10 |  | 26 |  | 16 | 16.2 | 12.2 |

WZCPO: the mixture of W oxide, Pd oxide, Cu oxide, and Zn oxide

Figure 9A:
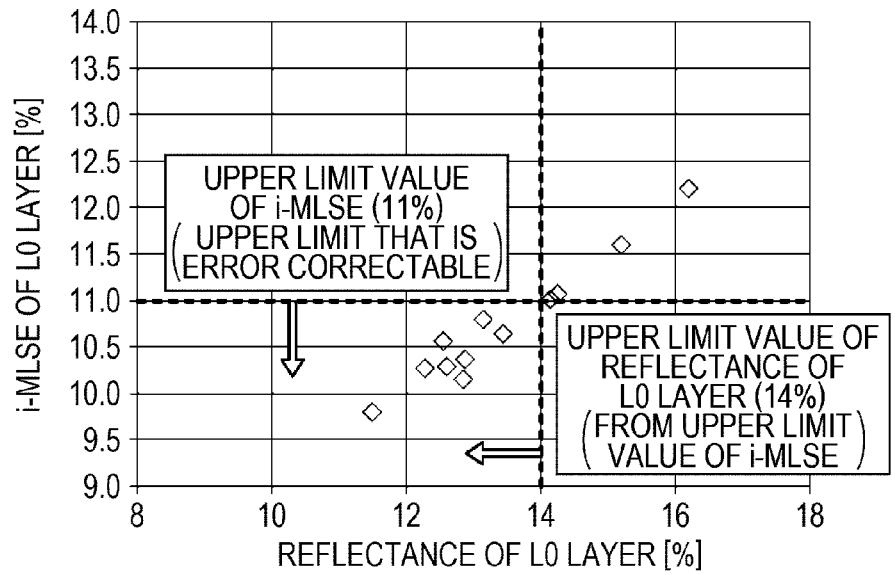
FIG. 9A is a graph showing the relationship between the i-MLSE of the L0 layer and the reflectance of the L0 layer in the optical information recording media of Test Examples 5-1 to 5-12.
Figure 9B:
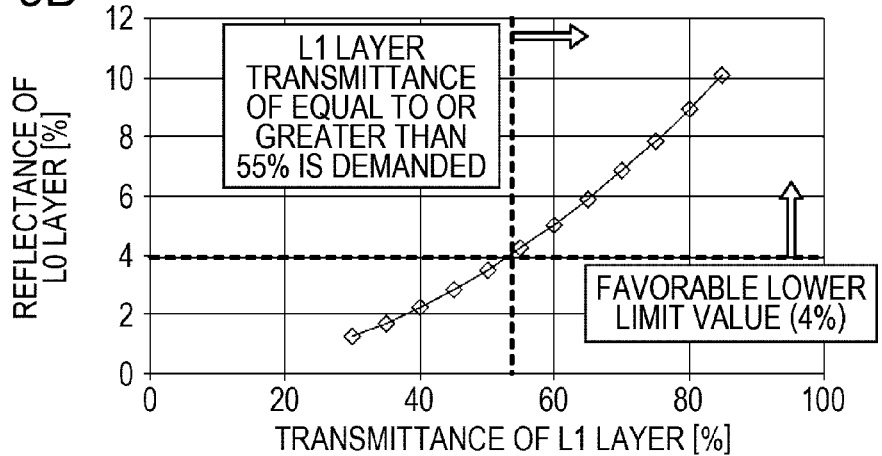
FIG. 9B is a graph showing the relationship between the reflectance of the L layer and the reflectance of the L0 layer in the optical information recording media of Test Examples 5-13 to 5-24.

FIG. 9A is a graph that illustrates the relationship between the i-MLSE and the reflectances calculated as described above. It is seen from FIG. 9A that for the i-MLSE value of the L0 layer to be equal to or less than 11%, it is important for the reflectance of the L0 layer to be equal to or less than 14%. Here, the i-MLSE value 11% is the upper limit value that is said to be error correctable by a consumer drive device. Although the reflectance was able to be improved by causing one or a combination of the first protective layer, the inorganic It may be understood from FIG. 9B that for the reflectance of the L1 layer of a two-layer optical information recording medium to be equal to or greater than 4%, it is important for the transmittance of the L layer to be equal to or greater than 55%. Here, the reflectance 4% of the L1 layer is the lower limit value that is demanded for an information signal to be reproduced using a consumer two-layer compatible drive device.

6. Transmittance Range of a Four-Layer Optical Information Recording Medium

Test Examples 6-1 to 6-9

The i-MLSE of the L0 layer was measured when the transmittance of the L1 layer alone of a four-layer optical information recording medium was made to vary. The results are illustrated in Table 5 and FIG. 9C. Here, since the recording properties of L1 are not the subject of interest, adjustment of the transmittance of the L1 layer was performed by the adjustment of the thickness of the inorganic recording layer according to the below conditions.

Specific film configurations of the L1 layer were as below.
First Protective Layer
Material: ITO, thickness: 7 nm
Inorganic Recording Layer
Material: WZCPO, thickness: 2 nm to 130 nm
Composition ratio: a=25, b=10, c=40, d=25
Second Protective Layer
Material: ITO, thickness: 10 nm
Specific film configurations of the L0 layer were as below.
First Protective Layer
Material: ITO, thickness: 8 nm
Inorganic Recording Layer
Material: WZCPO, thickness: 30 nm
Composition ratio: a=10, b=30, c=30, d=30
Second Protective Layer
Material: TaN, thickness: 10 nm Table 5 illustrates the transmittances of the L1 layer, and the i-MLSE values of the L0 layers of the optical information recording media of Test Examples 6-1 to 6-9.

TABLE 5

|  | Thickness of Inorganic Recording Layers of L1 Layer (nm) | Transmittance of L1 Layer (%) | i-MLSE of L0 Layer (%) |
| --- | --- | --- | --- |
| Test Example 6-1 | 130 | 35 | 14.6 |
| Test Example 6-2 | 100 | 40 | 13 |
| Test Example 6-3 | 80 | 45 | 12 |
| Test Example 6-4 | 60 | 50 | 11.2 |
| Test Example 6-5 | 50 | 55 | 10.8 |
| Test Example 6-6 | 40 | 60 | 10.5 |
| Test Example 6-7 | 30 | 65 | 10.2 |
| Test Example 6-8 | 15 | 70 | 10 |
| Test Example 6-9 | 2 | 75 | 10 |

Figure 9C:
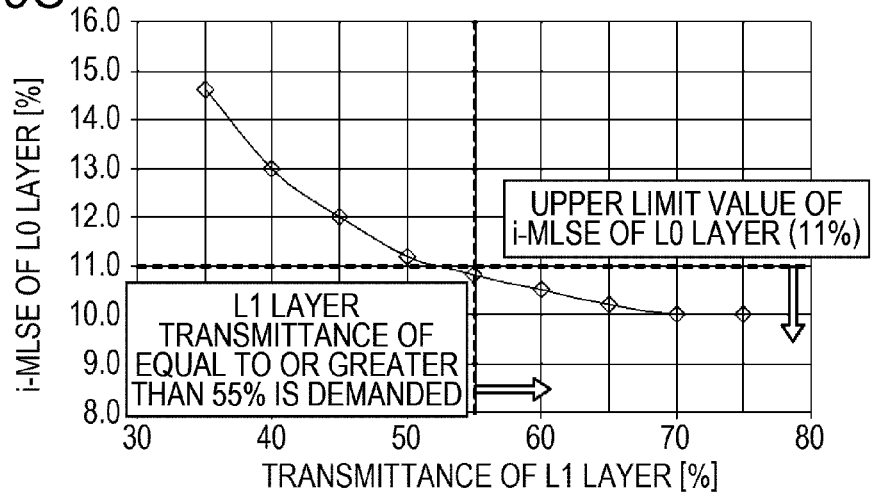
FIG. 9C is a graph showing the relationship between the transmittance of the L layer and the i-MLSE of the L0 layer in the optical information recording media of Test Examples 6-1 to 6-9.

It may be understood from FIG. 9C that for the i-MLSE value of the L0 layer to be equal to or less than 11%, it is important for the transmittance of the L1 layer to be equal to or greater than 55%. Here, the i-MLSE value 11% is the upper limit value that is error correctable by a consumer drive device. The reason is that in a case when the transmittance of the L1 layer is low, since the signal amount of the L0 layer decreases, it is thought that sufficient S/N for reproduction is not obtained. Therefore, the higher the transmittance of the L1 layer, the better the signal properties of the L0 layer.

In this manner, it is seen that with a multi-layer optical information recording medium with two layers or four layers, it is preferable that the transmittances of information signal layers equal to or higher than the L1 layer (L1 layer, L2 layer, L3 layer, . . . ) be equal to or greater than 55%.

Although the embodiments of the present disclosure have been described in detail above, the present disclosure is not limited to the embodiments described above, and various modifications based on the technical ideas of the embodiments of the present disclosure are possible.

For example, the configurations, methods, processes, shapes, materials, and numerical values exemplified in the embodiments described above are only examples, and different configurations, methods, processes, shapes, materials, and numerical values may be used as necessary.

Further, the configurations, methods, processes, shapes, materials, and numerical values of the embodiments described above may be combined with one another within a range which does not depart from the gist of the present disclosure.

Furthermore, although a case when the information recording medium includes a four-layer information signal layer has been described as an example in the embodiments described above, the number of layers of the information signal layer is not limited thereto, and it is possible for the information signal layer to have an arbitrary number of two or more layers.

In addition, although a case when the present disclosure is applied to an optical information recording medium with a configuration in which two or more information signal layers and a light transmission layer are laminated in such an order on a substrate and in which recording or reproduction of information signals is performed by irradiating laser beam on the information signal layers from the light transmission layer side has been described as an example in the embodiments described above, the present disclosure is not limited to such an example. For example, the present disclosure is able to be applied to an optical information recording medium with a configuration in which two or more information signal layers and a protective layer are laminated in such an order on a substrate and in which recording or reproduction of information signals is performed by irradiating laser beam on the two or more information signal layers from the substrate side or to an optical information recording medium with a configuration in which two or more information signal layers are provided between two substrates and in which recording or reproduction of information signals is performed by irradiating laser beam on the information signal layers from the side of one of the substrates.

Further, although a case where each layer of the optical information recording medium was formed by a sputtering method has been described as an example in the embodiments described above, the film formation method is not limited thereto, and other film formation methods may be used. As other film formation methods, for example, CVD methods (Chemical Vapor Deposition: technique in which a thin film is separated from vapor using a chemical reaction) such as heat CVD, plasma CVD, or light CVD, PVD methods (Physical Vapor Deposition: technique in which a thin film is formed by agglomerating a material that is physically vaporized in a vacuum on a substrate) such as vacuum deposition, plasma-assisted deposition, or ion plating may be used.

The present disclosure contains subject matter related to that disclosed in Japanese Priority Patent Application JP 2011-022182 filed in the Japan Patent Office on Feb. 3, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical information recording medium comprising:
   a substrate;
   a plurality of information signal layers provided on the substrate, each information signal layer including an inorganic recording layer, a first protective layer provided on a first main surface of the respective inorganic recording layer, and a second protective layer provided on a second main surface of the respective inorganic recording layer; and
   a cover layer provided on the information signal layers,
   wherein a first one of the information signal layers is provided with an inorganic recording layer including Pd oxide,
   wherein any one surface of sides of the substrate and the cover layer is a light irradiation plane irradiated with light in order to record or reproduce information signals on the plurality of information signal layers, and
   wherein of the first protective layer and the second protective layer of the first information signal layer, only the protective layer which is opposite to the light irradiation plane out of the first protective layer and the second protective layer includes a compound oxide of Si oxide, In oxide and Zr oxide as a main component.

2. The optical information recording medium according to claim 1,
   wherein for a second information signal layer, both the first protective layer and the second protective layer include the compound oxide as a main component.

3. The optical information recording medium according to claim 1,
   wherein the inorganic recording layer of at least one of the information signal layers includes W oxide, Pd oxide and Cu oxide as main components.

4. The optical information recording medium according to claim 3,
   wherein the inorganic recording layer further includes Zn oxide.

5. The optical information recording medium according to claim 1,
   wherein for a second information signal layer other than an information signal layer which is further to the back of the light irradiation plane, at least one of the first protective layer and the second protective layer includes the compound oxide as a main component.

6. The optical information recording medium according to claim 1,
   wherein for a second information signal layer closest to the light irradiation plane, at least one of the first protective layer and the second protective layer includes the compound oxide as a main component.

7. An optical information recording medium comprising:
   a substrate;
   a plurality of information signal layers provided on the substrate, each information signal layer including an inorganic recording layer, a first protective layer provided on a first main surface of the respective inorganic recording layer, and a second protective layer provided on a second main surface of the respective inorganic recording layer; and
   a cover layer provided on the information signal layers,
   wherein a first one of the information signal layers is provided with an inorganic recording layer including Pd oxide,
   wherein any one surface of sides of the substrate and the cover layer is a light irradiation plane irradiated with light in order to record or reproduce information signals on the plurality of information signal layers, and
   wherein of the first protective layer and the second protective layer of the first information signal layer, only the protective layer which is opposite to the light irradiation plane out of the first protective layer and the second protective layer includes a compound oxide of In oxide, Ga oxide and Zn oxide as a main component.

* * * * *